US009600163B2

(12) United States Patent
Kimura

(10) Patent No.: US 9,600,163 B2
(45) Date of Patent: Mar. 21, 2017

(54) MOBILE TERMINAL DEVICE, METHOD FOR CONTROLLING MOBILE TERMINAL DEVICE, AND PROGRAM

(71) Applicant: KYOCERA Corporation, Fushimi-ku, Kyoto (JP)

(72) Inventor: Yoshiyuki Kimura, Daito (JP)

(73) Assignee: KYOCERA CORPORATION, Kyoto (JP)

(*) Notice: Subject to any disclaimer, the term of this patent is extended or adjusted under 35 U.S.C. 154(b) by 198 days.

(21) Appl. No.: 14/487,331

(22) Filed: Sep. 16, 2014

(65) Prior Publication Data

US 2015/0012851 A1 Jan. 8, 2015

Related U.S. Application Data

(63) Continuation of application No. 13/497,902, filed as application No. PCT/JP2010/066677 on Sep. 27, 2010, now Pat. No. 8,847,995.

(30) Foreign Application Priority Data

Sep. 28, 2009 (JP) ................................ 2009-222525

(51) Int. Cl.
*G09G 5/00* (2006.01)
*G06F 3/0484* (2013.01)
(Continued)

(52) U.S. Cl.
CPC ........ *G06F 3/04847* (2013.01); *G06F 3/0481* (2013.01); *G06F 3/0486* (2013.01);
(Continued)

(58) Field of Classification Search
CPC combination set(s) only.
See application file for complete search history.

(56) References Cited

U.S. PATENT DOCUMENTS

| 5,345,543 A | 9/1994 | Capps et al. |
| 5,467,102 A | 11/1995 | Kuno et al. |
(Continued)

FOREIGN PATENT DOCUMENTS

| JP | 2002044202 A | 2/2002 |
| JP | 2009151348 A | 7/2009 |
(Continued)

OTHER PUBLICATIONS

International Search Report and Written Opinion dated Dec. 28, 2010, issued for International Application No. PCT/JP2010/066677.

*Primary Examiner* — M Good Johnson
(74) *Attorney, Agent, or Firm* — Procopio, Cory Hargreaves & Savitch, LLP

(57) ABSTRACT

A mobile phone includes a first display 11, a second display 21 arranged juxtaposed with the first display 11, and touch panels 12, 22 disposed on the displays 11, 21 for detecting that an icon has been dragged. In response to user's dragging an icon, a CPU 100 executes a reduced screen display processing of reducing in size a display screen of each of the displays 11, 21 to display the reduced display screens on the display on which the dragging operation is being performed. When the dragging operation has finished, the reduced display screens are returned to the display screens having the original size. Then, the CPU 100 displays the icon at a position, on the display screen having the original size, corresponding to the position of the icon on the reduced display screen at a time when the dragging operation has finished.

6 Claims, 18 Drawing Sheets

(51) Int. Cl.
*H04M 1/02* (2006.01)
*G06F 3/0488* (2013.01)
*G06F 3/0486* (2013.01)
*G06F 3/0481* (2013.01)

(52) U.S. Cl.
CPC ........ *G06F 3/0488* (2013.01); *G06F 3/04817* (2013.01); *H04M 1/0239* (2013.01); *H04M 1/0247* (2013.01); *H04M 2250/16* (2013.01); *H04M 2250/22* (2013.01)

(56) References Cited

U.S. PATENT DOCUMENTS

| | | | |
|---|---|---|---|
| 5,732,230 | A | 3/1998 | Cullen et al. |
| 6,545,669 | B1* | 4/2003 | Kinawi .................. G06F 3/0486 345/1.1 |
| 6,590,568 | B1* | 7/2003 | Astala .................. G06F 3/0486 178/18.01 |
| 7,970,438 | B2 | 6/2011 | Yoon et al. |
| 8,194,043 | B2 | 6/2012 | Cheon et al. |
| 8,473,870 | B2 | 6/2013 | Hinckley et al. |
| 8,607,148 | B2* | 12/2013 | Singh .................. G06F 3/0486 715/764 |
| 8,610,678 | B2* | 12/2013 | Ikeda .................. G06F 3/04883 345/1.1 |
| 8,773,360 | B2* | 7/2014 | Uchida ................ H04N 5/4401 345/173 |
| 8,854,317 | B2* | 10/2014 | Homma ................ G06F 3/0414 345/173 |
| 2002/0000998 | A1* | 1/2002 | Scott .................. G06F 17/30274 345/667 |
| 2008/0256466 | A1* | 10/2008 | Salvador ................ G06T 19/00 715/762 |
| 2010/0127994 | A1 | 5/2010 | Aono et al. |
| 2010/0259515 | A1 | 10/2010 | Kohara |
| 2011/0072394 | A1* | 3/2011 | Victor .................. G06F 3/0482 715/821 |
| 2011/0304584 | A1* | 12/2011 | Hwang ............... G06F 3/04845 345/174 |
| 2012/0131516 | A1* | 5/2012 | Chiu .................. G06F 3/04883 715/863 |

FOREIGN PATENT DOCUMENTS

| | | |
|---|---|---|
| JP | 2009211244 A | 9/2009 |
| WO | 2009075260 A1 | 6/2009 |

\* cited by examiner

MOBILE TERMINAL DEVICE, METHOD FOR CONTROLLING MOBILE TERMINAL DEVICE, AND PROGRAM

The present application is a continuation application of U.S. application Ser. No. 13/497,902 filed Mar. 23, 2012 which is the U.S. National Stage application of International PCT application PCT/JP2010/066677 filed on Sep. 27, 2010, which claims priority under 35 U.S.C. §119 to Japanese Patent Application No. 2009-222525 filed on Sep. 28, 2009. The contents of each of these applications are incorporated herein by reference in their entirety.

TECHNICAL FIELD

The present invention relates to a mobile terminal device such as a mobile phone and a PDA (Personal Digital Assistant), and a method for controlling the mobile terminal device, and a program.

BACKGROUND ART

Generally, a mobile phone is configured to display an operation screen, a mail document, and a television image on a display such as a liquid crystal panel. A large-sized display makes it possible to display a large amount of information (such as documents) at one time, or largely display a television image. On the other hand, however, the large-sized display results in an increase in the size of the device itself, which hinders portability of the device.

In view of the above, there is proposed a mobile phone having a first display which is constantly exposed to the outside, and a second display which is accommodated in the phone body when the phone is carried, and is allowed to be exposed to the outside as necessary, wherein an image is displayed on a single display plane formed by integrating the two displays into one unit (see e.g. patent Document 1).

SUMMARY OF INVENTION

Technical Problem

Recently, there have been commercialized mobile phones configured in such a manner that a touch panel is disposed on a display, and a user is allowed to execute various applications by touching an icon displayed on the display with his or her fingertip. Such a mobile phone is operable to move an icon to an intended position on the screen by a dragging operation.

The mobile phone provided with two displays may also be configured to dispose a touch panel on each of the displays so that the user is allowed to perform an input operation using the touch panels. In this case, an icon may be moved between the first display and the second display by a dragging operation.

However, normally, there is a region corresponding to a part of a cabinet for accommodating a display between the first display and the second display. In this arrangement, when a dragging operation is performed, the finger touch onto the display surface is temporarily interrupted in the region corresponding to the part of the cabinet, with the result that it may be difficult to detect a dragging operation between the two displays.

As a result, erroneous determination may be made such that the dragging operation has finished at one end of one of the two displays, despite that the icon has been dragged from the one display to the other display by the dragging operation, and the icon may stagnate at the one end.

In view of the above, an object of the invention is to provide a mobile terminal device that enables to precisely perform a dragging operation between two display sections.

Solution to Problem

A mobile terminal device according to an aspect of the invention includes a first display section; a second display section arranged juxtaposed with the first display section; a display control section which controls display of the first display section and the second display section; and a detecting section which detects that an object to be moved displayed on the first display section or the second display section has been dragged. In this arrangement, the display control section is operable: to execute a reduced screen display processing of reducing in size a display screen displayed on the first display section and the second display section to display the reduced display screen on the display section on which the dragging operation is being performed, when the object to be moved is being dragged; and to return the reduced display screen to a display screen of a size before the size reduction to display the display screen of the size before the size reduction on the first display section and the second display section when the dragging operation has finished, and to display the object to be moved at a position, on the display screen of the size before the size reduction, corresponding to a position of the object to be moved on the reduced display screen at a time when the dragging operation has finished.

A second aspect of the invention relates to a method for controlling a mobile terminal device provided with a first display section and a second display section arranged juxtaposed with the first display section. The method for controlling a mobile terminal device according to the second aspect includes a step of reducing in size a display screen displayed on the first display section and the second display section to display the reduced display screen on the first display section, when an object to be moved displayed on the first display section is being dragged; and a step of returning the reduced display screen to a display screen of a size before the size reduction to display the display screen of the size before the size reduction on the first display section and the second display section when the dragging operation has finished, and of displaying the object to be moved at a position, on the display screen of the size before the size reduction, corresponding to a position of the object to be moved on the reduced display screen at a time when the dragging operation has finished.

A program according to the third aspect of the invention causes a computer in a mobile terminal device provided with a first display section and a second display section arranged juxtaposed with the first display section to execute the following steps of reducing in size a display screen displayed on the first display section and the second display section to display the reduced display screen on the first display section, when an object to be moved displayed on the first display section is being dragged; and returning the reduced display screen to a display screen of a size before the size reduction to display the display screen of the size before the size reduction on the first display section and the second display section when the dragging operation has finished, and displaying the object to be moved at a position, on the display screen of the size before the size reduction, corresponding to a position of the object to be moved on the reduced display screen at a time when the dragging operation has finished.

Figure 1:
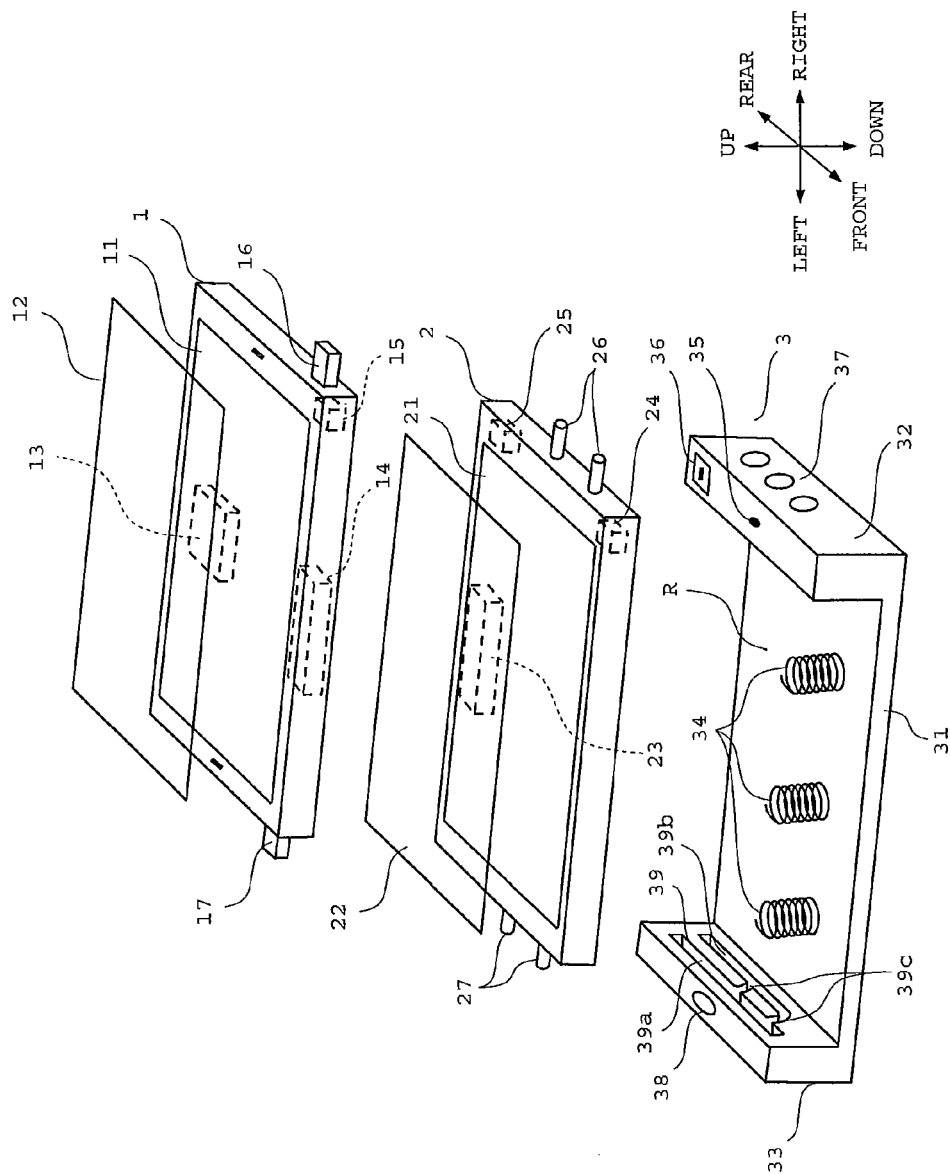
FIG. 1 is a diagram showing an external arrangement of a mobile phone embodying the invention.

The drawings are provided mainly for describing the present invention, and do not limit the scope of the present invention.

DESCRIPTION OF EMBODIMENTS

In the following, an embodiment of the invention is described referring to the drawings.

In the embodiment, a first display 11 corresponds to a "first display section" in the claims. A second display 21 corresponds to a "second display section" in the claims. A first touch panel 12 and a second touch panel 22 correspond to a "detecting section" in the claims. A CPU 100 corresponds to a "display control section" in the claims. The description regarding the correspondence between the claims and the embodiment is merely an example, and the claims are not limited by the description of the embodiment.

FIG. 1 is a diagram (an exploded perspective view) showing an arrangement of a mobile phone. The mobile phone is constituted of a first cabinet 1, a second cabinet 2, and a holder 3 which holds the first and second cabinets 1, 2.

The first cabinet 1 has a rectangular parallelepiped shape with a long size in a horizontal direction. A first display 11 is disposed in the first cabinet 1, and a display plane of the first display 11 faces the outside of the first cabinet 1. As will be described later, the first display 11 is constituted of a first liquid crystal panel 11a, and a first backlight 11b for illuminating the first liquid crystal panel 11a.

A first touch panel 12 is disposed on the front surface of the first display 11. The first touch panel 12 has a transparent sheet-like shape, and a user is allowed to view a display screen to be displayed on the display 11 through the first touch panel 12.

The first touch panel 12 is provided with first transparent electrodes and second transparent electrodes arranged in a matrix. The first touch panel 12 is operable to detect a position on the display plane touched by the user by detecting a change in the electrostatic capacity between the first and second transparent electrodes, and output a position signal based on the detected position. The first touch panel 12 is not limited to an electrostatic capacitive touch panel, but may be a resistive film touch panel, a pressure sensitive touch panel or a like.

A camera module 13 is disposed in the first cabinet 1 at a position slightly rearward from a center portion of the first cabinet 1. A lens window (not shown) for taking a subject image to be captured by the camera module 13 is formed in the under surface of the first cabinet 1. Further, in the first cabinet 1, a magnet 14 is disposed at a center position near the front surface, and a magnet 15 is disposed at a front right corner portion. Furthermore, projections 16, 17 are respectively formed at the right side surface and the left side surface of the first cabinet 1.

The second cabinet 2 has a rectangular parallelepiped shape with a long size in a horizontal direction. Specifically, the second cabinet 2 has substantially the same shape and size as the first cabinet 1. A second display 21 is disposed in the second cabinet 2, and a display plane of the second display 21 faces the outside of the second cabinet 2. As will be described later, the second display 21 is constituted of a second liquid crystal panel 21a, and a second backlight 21b for illuminating the second liquid crystal panel 21a. The first display 11 and the second display 21 may be each constituted of other display element such as an organic electroluminescence (EL).

A second touch panel 22 is disposed on the front surface of the second display 21. The arrangement of the second touch panel 22 is the same as the first touch panel 12.

A magnet 23 is disposed in the second cabinet 2 at a center position near the rear surface of the second cabinet 2. As will be described later, the magnet 23, and the magnet 14 in the first cabinet 1 are configured to be attracted to each other when the first cabinet 1 and the second cabinet 2 are positioned in such a state (a second display state) as to form a large screen. As far as one of the magnets in the first cabinet 1 and the second cabinet 2 has a sufficiently large magnetic force, a magnetic member may be used in place of the other magnet.

In the second cabinet 2 a closing sensor 24 is disposed at a front right corner portion, and an opening sensor 25 is disposed at a rear right corner portion thereof. Each of the sensors 24, 25 is constituted of e.g. a hall IC, and outputs a detection signal in response to a magnetic force of the corresponding magnet. As will be described later, when the first cabinet 1 and the second cabinet 2 are brought to such a state that the first cabinet 1 and the second cabinet 2 are placed one over the other, the magnet 15 in the first cabinet 1 comes close to the closing sensor 24, and accordingly, an ON-signal is output from the closing sensor 24. On the other hand, when the first cabinet 1 and the second cabinet 2 are brought to such a state that the first cabinet 1 and the second cabinet 2 are juxtaposed in front and rear directions, the magnet 15 in the first cabinet 1 comes close to the opening sensor 25, and accordingly, an ON-signal is output from the opening sensor 25.

Further, two stem portions 26 are formed on the right side surface of the second cabinet 2, and two stem portions 27 are formed on the left side surface of the second cabinet 2.

The holder 3 is constituted of a bottom plate portion 31, a right holding portion 32 formed on a right end of the bottom plate portion 31, and a left holding portion 33 formed on a left end of the bottom plate portion 31. The first cabinet 1 and the second cabinet 2 are housed in a state that the first cabinet 1 and the second cabinet 2 are placed one over the other in a housing region R enclosed by the bottom plate portion 31, the right holding portion 32, and the left holding portion 33.

Three coil springs 34 are disposed side by side in left and right directions on the bottom plate portion 31. The three coil springs 34 are abutted against the under surface of the second cabinet 2 in a state that the second cabinet 2 is mounted on the holder 3, whereby a force to press the second cabinet 2 upward is applied to the second cabinet 2.

A microphone 35 and a power source key 36 are disposed on the top surface of the right holding portion 32. Further, an operation key group 37 is disposed on the outer side surface of the right holding portion 32. The operation key group 37 is constituted of a plurality of keys such as a key for setting a manner mode. The user is allowed to execute certain kinds of functions by manipulating these keys, without manipulating the touch panels 12, 22. A phone speaker 38 is disposed on the top surface of the left holding portion 33. The user is allowed to make a phone call by holding the mobile phone, with the left holding portion 33 side close to the ear, and the right holding portion 32 side close to the mouth.

Guide grooves 39 (only the guide groove 39 in the left holding portion 33 is shown) are formed in the inner side surfaces of the right holding portion 32 and the left holding portion 33. Each of the guide grooves 39 is constituted of an upper groove 39a and a lower groove 39b extending in front and rear directions, and two vertical grooves 39c formed in a front portion of the guide groove and extending in up and down directions in such a manner as to connect between the upper groove 39a and the lower groove 39b.

In assembling the parts into the mobile phone, the second cabinet 2 is disposed in the housing region R of the holder 3 in such a manner that the stem portions 26, 27 are received in the lower grooves 39b of the guide grooves 39, and the first cabinet 1 is disposed on the second cabinet 2 in the housing region R of the holder 3 in such a manner that the projections 16, 17 are received in the upper grooves 39a of the guide grooves 39.

By performing the above operation, the first cabinet 1 is slidably movable in front and rear directions while being guided along the upper grooves 39a. Likewise, the second cabinet 2 is slidably movable in front and rear directions while being guided along the lower grooves 39b. Further, when the second cabinet 2 is moved forward to such a position that the stem portions 26, 27 reach the vertical grooves 39c, the second cabinet 2 is slidably movable in up and down directions while being guided along the vertical grooves 39c.

Figure 2:
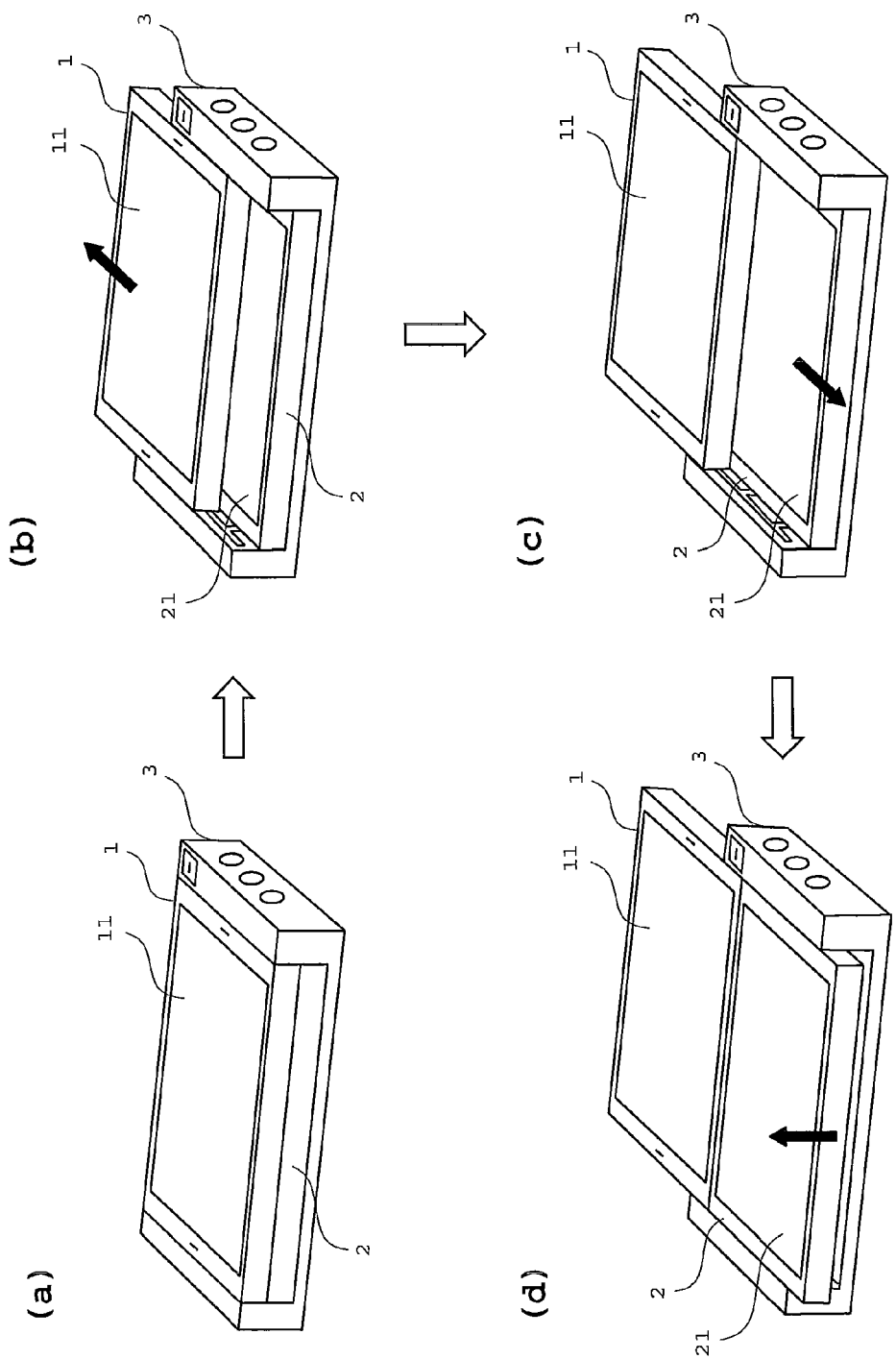
FIG. 2 is a diagram for describing a switching operation from a first display state by a first display, and a second display state by the first display and a second display in the embodiment.

FIG. 2 is a diagram for describing an operation of switching from a first display state by the first display 11 to a second display state by the first display 11 and the second display 21.

As shown in FIG. 2(a), in an initial state, the second cabinet 2 is in a state that the second cabinet 2 is hidden behind the first cabinet 1. In this state, only the first display 11 is exposed to the outside. This state is called as a "first display state". The switching operation is manually performed by the user.

At first, as shown in FIG. 2(b), the user slides the first cabinet 1 rearwardly. When the rearward movement of the first cabinet 1 is finished, as shown in FIG. 2(c), the user withdraws the second cabinet 2 forwardly. When the second cabinet 2 is moved to such a position that the second cabinet 2 does not overlap the first cabinet 1 at all, in other words, when the second cabinet 2 is moved to such a position that the second cabinet 2 is juxtaposed in front of the first cabinet 1 by the withdrawing operation, as described above, the stem portions 26, 27 come to the positions corresponding to the vertical grooves 39c. Then, the second cabinet 2 is pressed upward by the coil springs 34. When the above operation is performed, the magnet 14 and the magnet 23 are attracted to each other, and accordingly, a further upward moving force is exerted on the second cabinet 2. Then, as shown in FIG. 2(d), the first cabinet 1 and the second cabinet 2 are juxtaposed on the same plane in a state that the first cabinet 1 and the second cabinet 2 are firmly contacted with each other in front and rear directions. Thus, the first display 11 and the second display 21 are integrated to form one large screen. This state is called as a "second display state".

Figure 3:
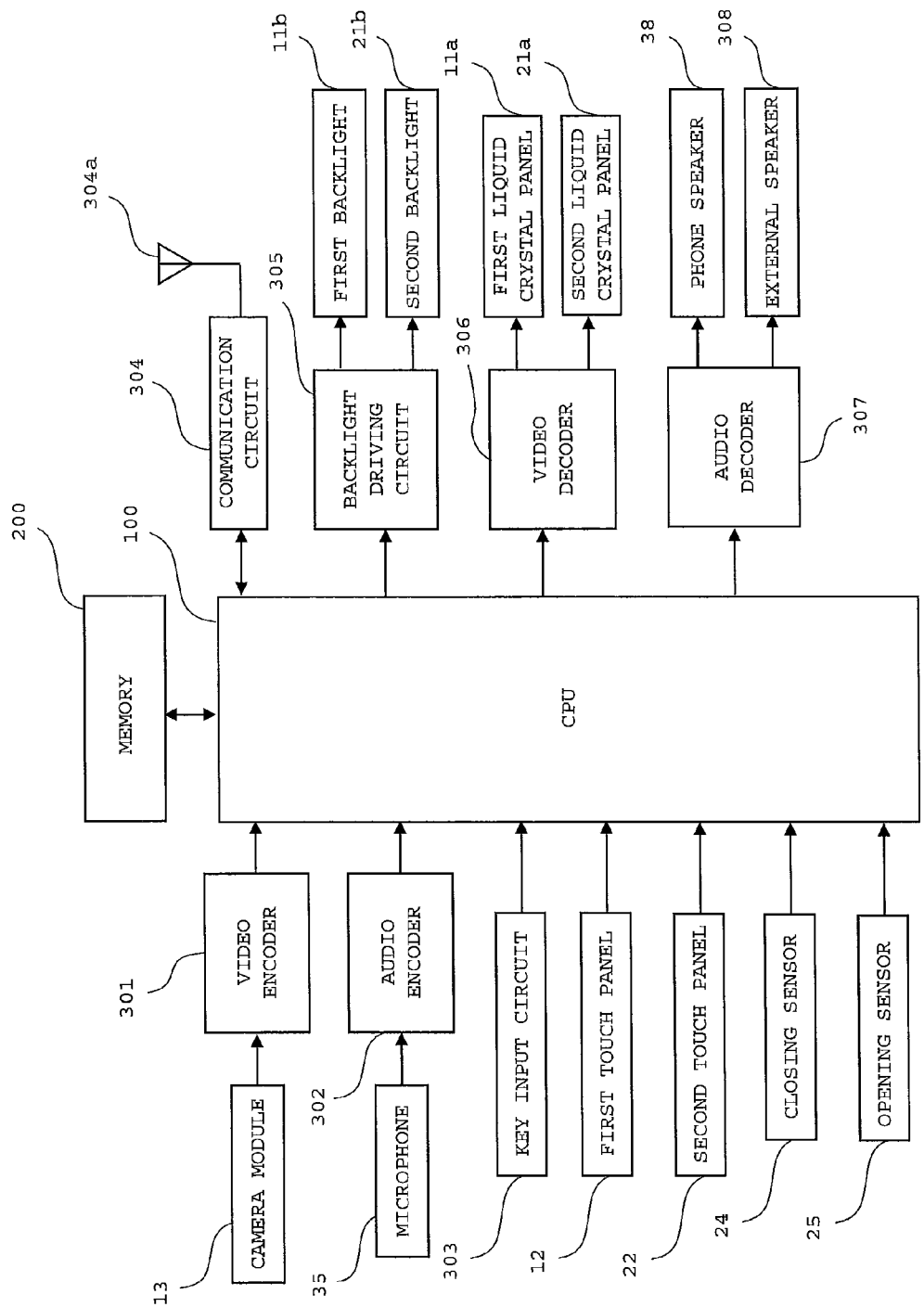
FIG. 3 is a block diagram showing an overall configuration of the mobile phone in the embodiment.

FIG. 3 is a block diagram showing an overall configuration of the mobile phone. The mobile phone in the embodiment is provided with, in addition to the aforementioned elements, a CPU 100, a memory 200, a video encoder 301, an audio encoder 302, a key input circuit 303, a communication circuit 304, a backlight driving circuit 305, a video decoder 306, an audio decoder 307, and an external speaker 308.

The camera module 13 has an image sensor such as a CCD sensor. The camera module 13 digitizes an image signal output from the image sensor, and applies various corrections such as gamma correction to the image signal, and the processed signal is output to the video encoder 301. The video encoder 301 applies an encoding processing to the image signal from the camera module 13, and outputs the processed signal to the CPU 100.

The microphone 35 converts collected sounds into an audio signal, and outputs the audio signal to the audio encoder 302. The audio encoder 302 converts the analog audio signal from the microphone 35 into a digital audio signal, applies an encoding processing to the digital audio signal, and outputs the processed signal to the CPU 100.

In response to user's manipulation of the power source key 36 and each key in the operation key group 37, the key input circuit 303 outputs an input signal corresponding to each key to the CPU 100.

The communication circuit 304 converts transmission data such as an audio signal, an image signal, a text signal from the CPU 100 into a radio signal, and transmits the radio signal to a base station via an antenna 304a. Further, the communication circuit 304 converts the radio signal received via the antenna 304a into received data such as an audio signal, an image signal, a text signal, and outputs the received data to the CPU 100.

The backlight driving circuit 305 supplies a voltage signal based on a control signal from the CPU 100 to the first backlight 11a and the second backlight 21b. The first backlight 11b is turned on by a voltage signal from the backlight driving circuit 305 for illuminating the first liquid crystal panel 11a. The second backlight 21b is turned on by a voltage signal from the backlight driving circuit 305 for illuminating the second liquid crystal panel 21a.

The video decoder 306 converts a video signal from the CPU 100 into an analog or digital video signal displayable on the first liquid crystal panel 11a and the second liquid crystal panel 21a, and outputs the converted video signal to the first and second liquid crystal panels 11a, 21a. The first liquid crystal panel 11a and the second liquid crystal panel 21a display an image (a display screen) based on a video signal on the respective corresponding display planes.

The audio decoder 307 applies a decoding processing to an audio signal from the CPU 100, and converts the processed signal into an analog audio signal for outputting to the phone speaker 38. Further, the audio decoder 307 applies a decoding processing to a sound signal of various alert sounds such as a ringtone and an alarm sound from the CPU 100, and converts the processed signal into an analog sound signal for outputting to the external speaker 308. The phone speaker 38 reproduces an audio signal from the audio decoder 307 as a sound. The external speaker 308 reproduces a ringtone or the like from the audio decoder 307.

The memory 200 includes an ROM and an RAM. A control program for causing the CPU 100 to execute various control functions is stored in the memory 200. Further, image data captured by the camera module 13, image data, text data (mail data) taken from the outside via the communication circuit 304, and the like are saved in the memory 200 in a predetermined file format.

The CPU 100 causes the camera module 13, the microphone 35, the communication circuit 304, the liquid crystal panels 11a, 21a, the phone speaker 38, the external speaker 308, and the like to operate in accordance with the control program, based on an operation input signal from the key input circuit 303 and the touch panels 12, 22. With this arrangement, the mobile phone is operable to execute various functions (applications) such as a phone call function and an electronic mail function.

Further, the CPU 100 generates a display screen to be display on each of the displays 11, 21 within a work area prepared in the memory 200, and outputs a video signal for configuring a display screen.

Figure 4:
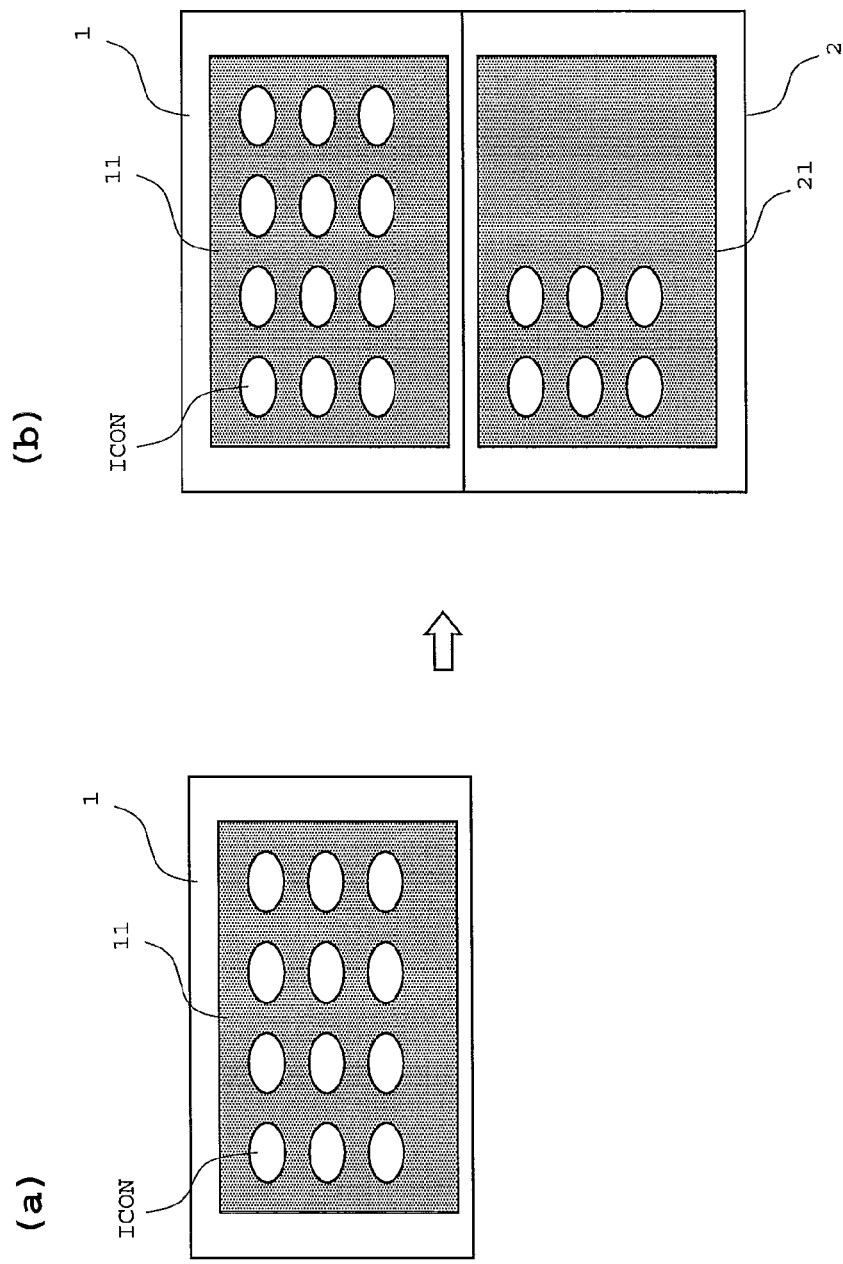
FIG. 4 is a diagram showing a screen display example on the first display and the second display in the embodiment.

FIG. 4 is a diagram showing a screen display example in the first display 11 and the second display 21.

When the second cabinet 2 is closed, a display screen is displayed on the first display 11. For instance, a menu screen is displayed as an initial screen on the first display 11. As shown in FIG. 4(a), for instance, icons for allowing the user to execute various applications are displayed on the menu screen. The applications may be obtained by e.g. downloading through the Internet, and the obtained applications are added to the mobile phone by installation. The number of icons increases, as the number of the obtained applications increases, and eventually, all the icons may be unable to be displayed on one display screen. In such a case, as shown in FIG. 4(b), the user is allowed to open the second cabinet 2, and when the mobile phone is brought to the second display state constituted by the first display 11 and the second display 21, the icons which could not be displayed any more on the first display 11 are allowed to be displayed on the second display 21.

The icons displayed on each of the displays 11, 21 are allowed to be moved to an intended position by a dragging operation. In this embodiment, it is possible to move the icons by a dragging operation not only in the area of one display but also between the first display 11 and the second display 21. For instance, icons representing applications having a high frequency of use may be displayed on the first display 11. If the frequency of use of the application represented by a certain icon is lowered, the icon of the application may be moved to the second display 21 by a dragging operation.

Figure 5:
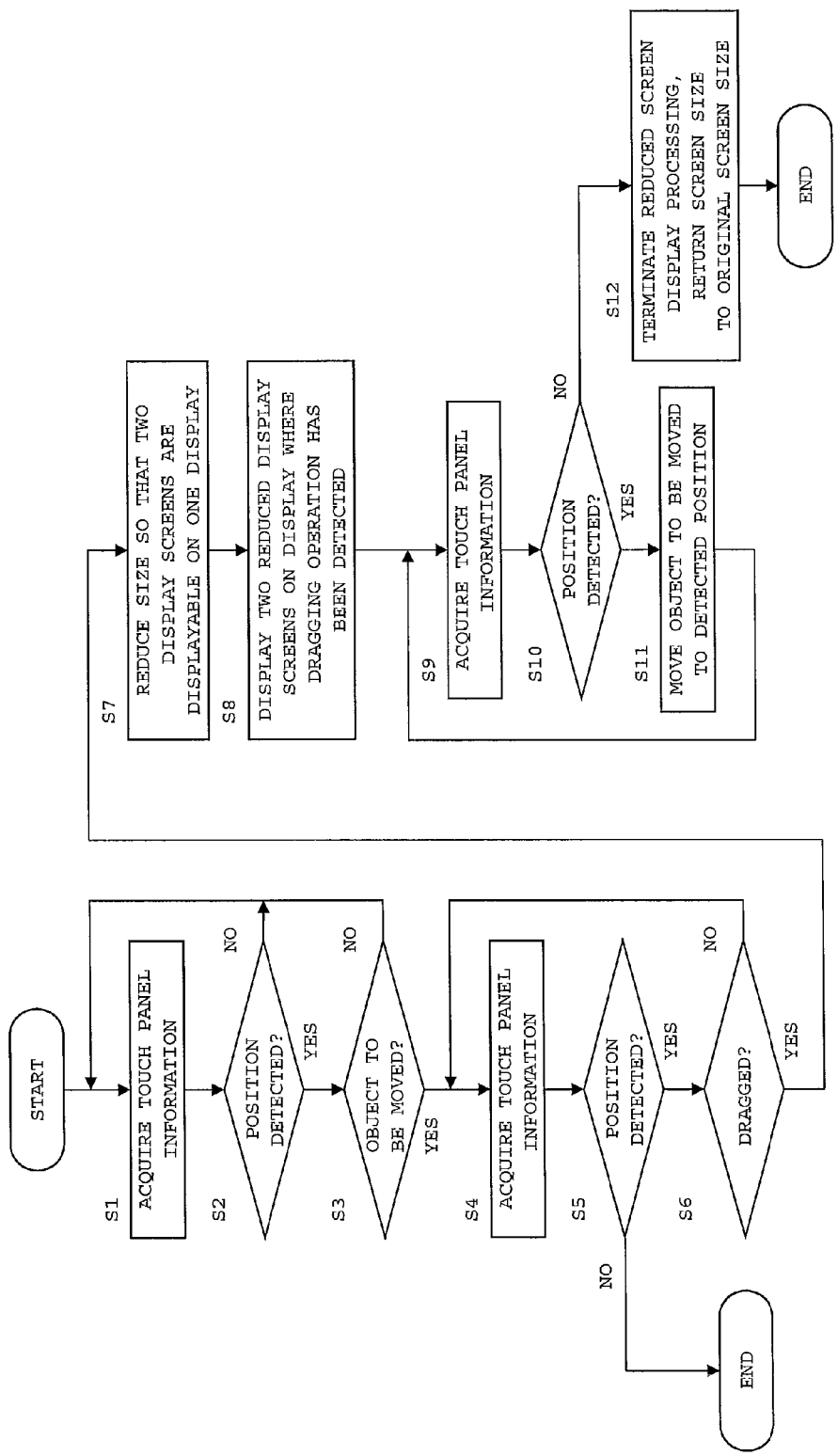
FIG. 5 is a flowchart showing a display control processing to be performed in the case where a dragging operation is performed in the second display state in the embodiment.
Figure 6:
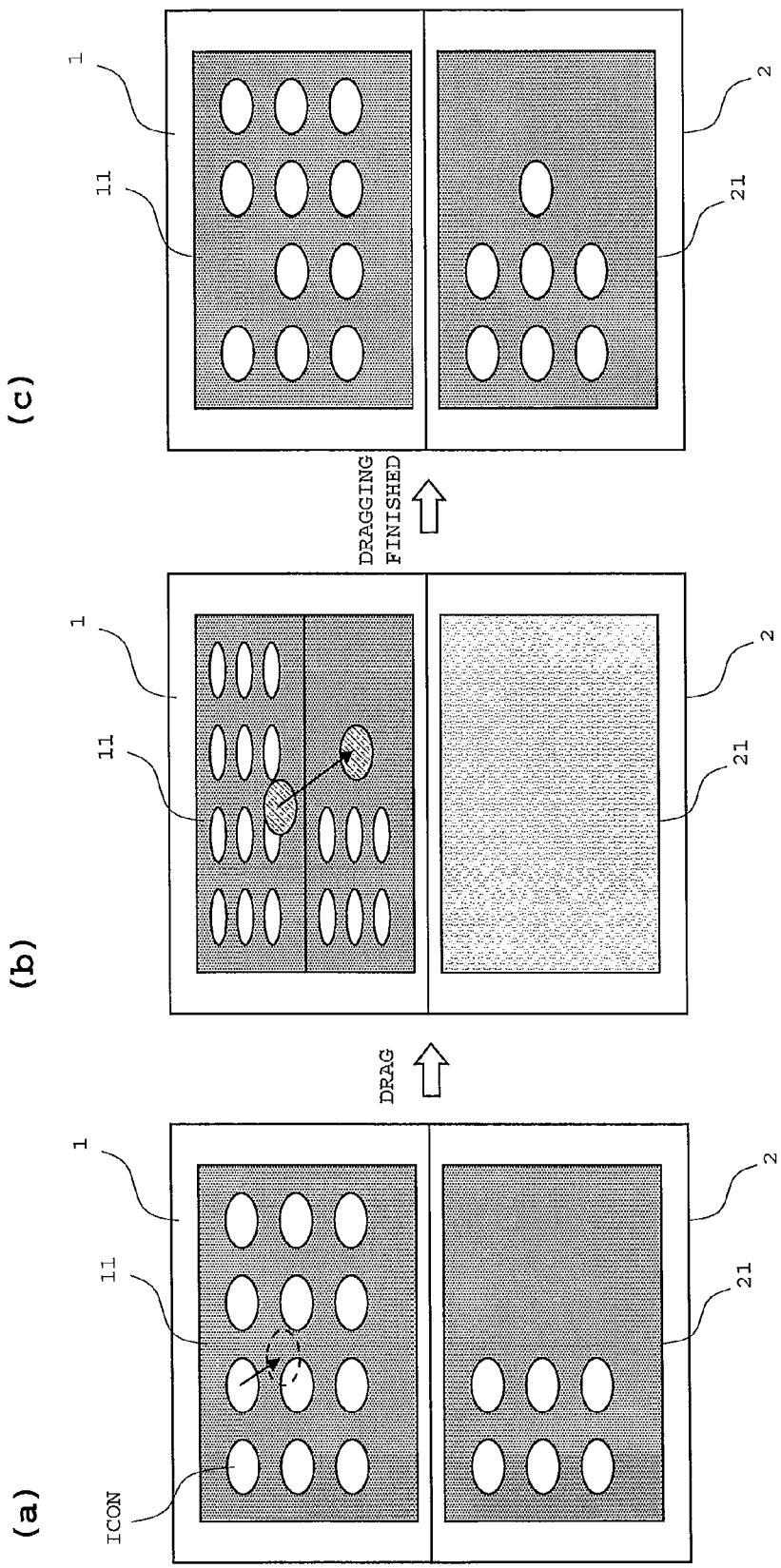
FIG. 6 is a diagram showing a screen display example in the case where a dragging operation is performed from the first display to the second display in the embodiment.

FIG. 5 is a flowchart showing a display control processing to be performed in the case where a dragging operation is performed in the second display state. Further, FIG. 6 is a diagram showing a screen display example in the case where a dragging operation is performed from the first display 11 to the second display 21. In the following, the processing operation to be performed in the embodiment is described by way of an example, in which an icon displayed on the first display 11 is dragged.

Referring to FIG. 5, the CPU 100 acquires a signal from each of the touch panels 12, 22 (S1), and detects whether the acquired signal is a position signal (S2). For instance, upon user's touching an icon displayed on the first display 11 for dragging, a position signal based on the touched position is output from the first touch panel 12. The position signal is composed of a signal representing a position (a coordinate) on the display in up and down directions, and a signal representing a position (a coordinate) on the display in left and right directions.

Upon detecting a position signal from the first touch panel 12 (S2: YES), the CPU 100 determines whether the icon (an object to be moved) exists in the detected position (S3). Then, if it is determined that the icon exists in the detected position (S3: YES), the CPU 100 acquires a signal from the first touch panel 12 again (S4), and detects whether the acquired signal is a position signal (S5). If a position signal is detected again (S5: YES), the CPU 100 determines whether the icon has been dragged (S6). The CPU 100 compares between the currently detected position and the previously detected position, and determines that a dragging operation has been performed if the detected positions are different from each other.

If it is determined that a dragging operation has been performed (S6: YES) in response to user's dragging the icon (see FIG. 6(a)), the CPU 100 executes a reduced screen display processing. Specifically, the CPU 100 halves the size of the display screen (hereinafter, called as a "first screen") displayed on the first display 11, and the size of the display screen (hereinafter, called as a "second screen") displayed on the second display 21 in up and down directions, so that both of the display screens having the reduced size are displayable on one display (S7). Then, the CPU 100 causes to display both of the first screen and the second screen on the display in which the dragging operation has been performed, in other words, on the first display 11 (S8). When the above operation is performed, an icon having a reduced size accompanied by the size reduction of the display screens is displayed on the first display 11 (see FIG. 6(b)). It should be noted that the icon to be dragged is retained at the position touched by the user, even if the screen is switched.

Then, the CPU 100 acquires a signal from the first touch panel 12 again (S9), and detects whether the acquired signal is a position signal (S10). Then, if a position signal is detected again (S10: YES), the CPU 100 causes to move the dragged icon to the detected position (S11). By performing this operation, the dragged icon is displayed at the detected position (see FIG. 6(b)). When the above operation is performed, the icon to be displayed at the detected position has a size before the size reduction, and the icon is displayed with a display manner (for instance, in a semi-transparent state) recognizable to the user that the icon is being dragged. To simplify the description, the icon being dragged is indicated with a hatched portion in FIG. 6(b).

Thereafter, when the user continues to drag the icon, the CPU 100 repeats the processings from Step S9 through Step S11. By performing the above operation, the icon is moved on the first display 11 in accordance with the dragging operation.

In the case where the user intends to move the dragged icon to the second display 21, as shown in FIG. 6(b), the user moves the icon on the second screen. Then, when the user drags the icon to an intended position on the second screen, the user detaches his or her fingertip from the first display 11, whereby the dragging operation is finished.

When the user finishes the dragging operation, a position signal from the first touch panel 12 is no longer detected. When a position signal is no longer detected in Step S10 (S10: NO), the CPU 100 determines that the dragging operation has finished, and returns the size of the first screen and the second screen to the original size. Then, the CPU 100 causes the first display 11 to display the first screen, and causes the second display 21 to display the second display (S12). As shown in FIG. 6(c), the CPU 100 erases the dragged icon from the first screen. Then, the CPU 100 causes to display the dragged icon at a position on the second screen, corresponding to the position of the icon on the second screen having the reduced size at a time when the dragging operation has finished.

In the case where the user detaches e.g. his or her fingertip without dragging the icon, regardless of temporarily touching the icon, it is determined in Step S6 that the dragging operation has not been performed (S6: NO), and a position signal is no longer detected in Step S5 (S5: NO). Thus, the processing is ended without changing the display on the first display 11.

Further, as shown in FIG. 6(b), any display manner may be available, as the display manner of the counterpart display in the case where the two display screens are moved to one display. For instance, a specific background image (including a single-color image such as an all-white image) may be displayed, or a previously displayed screen may be displayed as it is on the counterpart display. Further alternatively, the counterpart display may be turned off.

As described above, in this embodiment, in the case where an object to be moved such as an icon is dragged between the first display 11 and the second display 21, there is no likelihood that a dragging operation may be performed in a region corresponding to a part of the cabinet devoid of the displays. Accordingly, the above arrangement enables to easily detect a dragging operation. Thus, the user is allowed to precisely perform a dragging operation between the two displays 11, 12.

Further, actually, there is no need of moving an icon between two displays, and the user is allowed to move the icon within the area of one display. This enables to shorten the moving distance of an icon, and allows the user to quickly drag the icon.

<First Modification>

Figure 7:
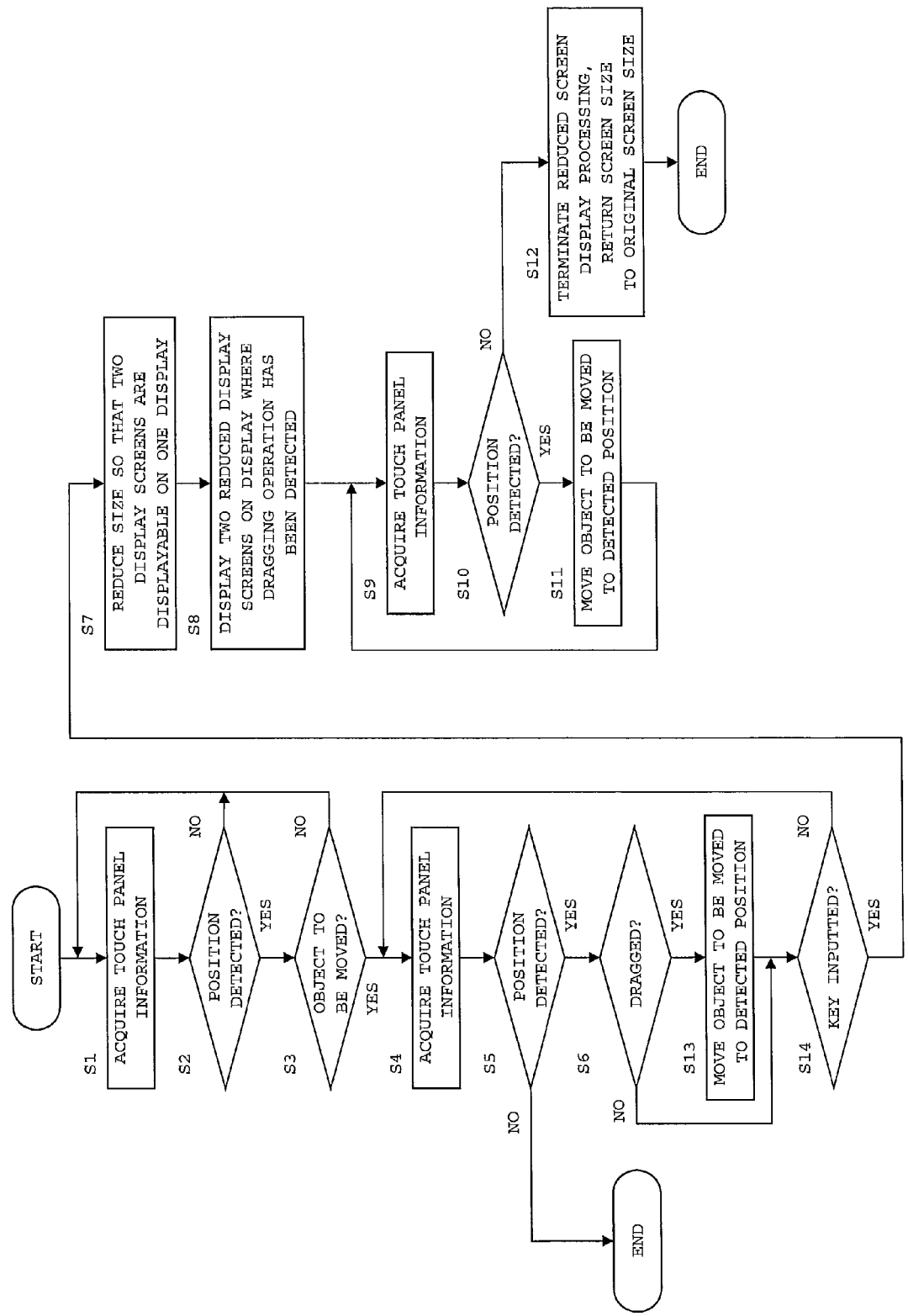
FIG. 7 is a flowchart showing a display control processing to be performed in the case where a dragging operation is performed in the second display state in a first modification.
Figure 8:
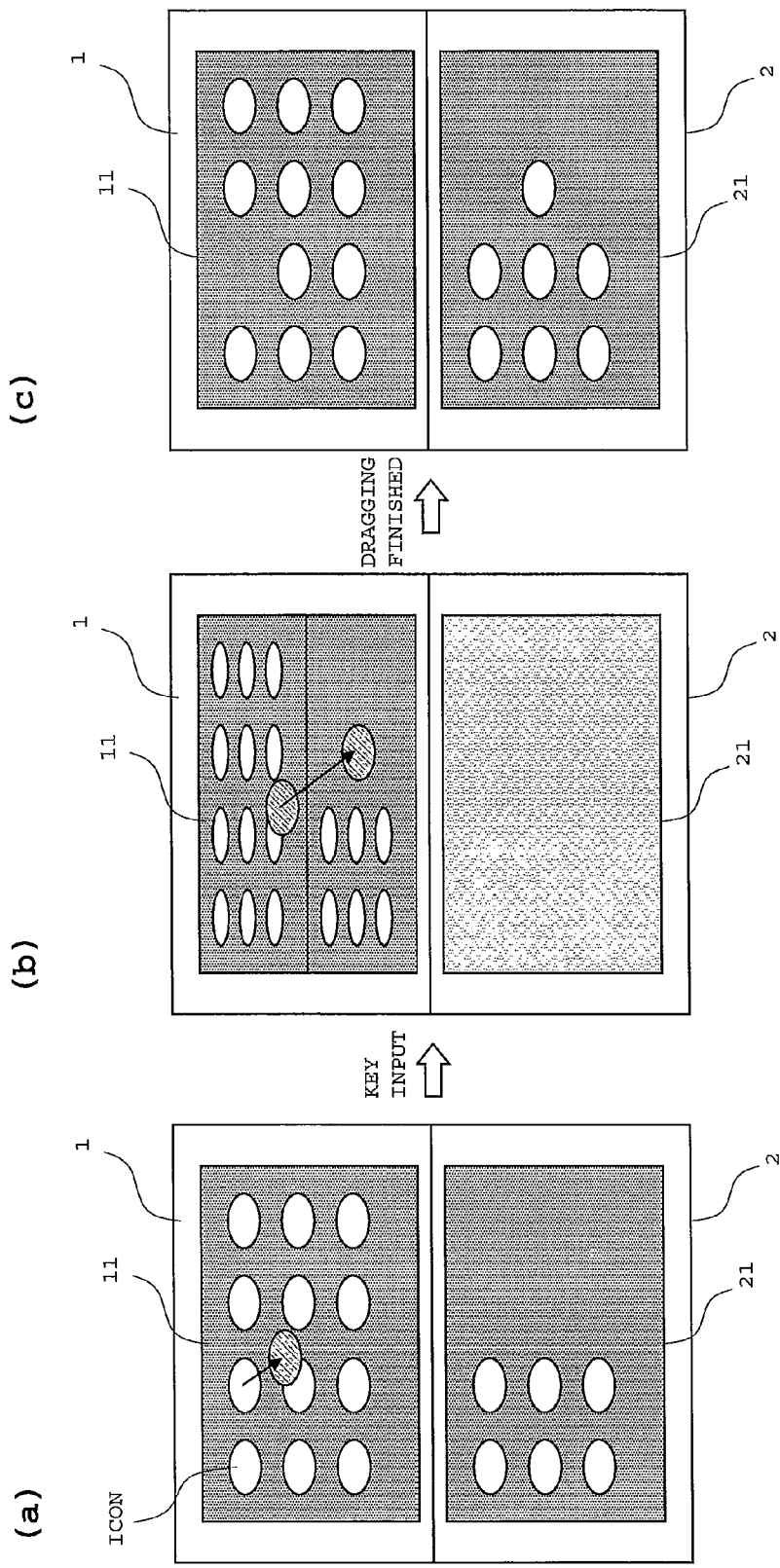
FIG. 8 is a diagram showing a screen display example in the case where a dragging operation is performed from the first display to the second display in the first modification.

FIG. 7 is a flowchart showing a display control processing to be performed in the case where a dragging operation is performed in the second display state in the first modification. Further, FIG. 8 is a diagram showing a screen display example in the first modification, in the case where a dragging operation is performed from the first display 11 to the second display 21.

In the embodiment, when a dragging operation is started, the reduced screen display processing (S7, S8) is constantly executed. Accordingly, even in the case where the user intends to drag an icon within the area of one display, the dragging operation is performed in the reduced display screen. In this case, an image such as an icon is displayed with a small size, which may obstruct the user's manipulation.

In view of the above, in the arrangement of the first modification, the reduced screen display processing (S7, S8) is executed only in the case where the user intends to do so.

In the following, the processing operation to be performed in the first modification is described by way of an example, in which an icon displayed on the first display 11 is dragged in the same manner as the embodiment. In this section, only the processing which differs from the processing in the embodiment is described.

If it is determined that a dragging operation has been performed in Step S6, the CPU 100 causes the dragged icon (an object to be moved) to move to the currently detected position (S13). By performing the above operation, the icon dragged to the currently detected position is displayed with a display manner indicating that the icon is being dragged (see FIG. 8(a)).

Then, the CPU 100 determines whether an input operation for a certain key in the operation key group 37 has been performed (S14). If it is determined that there is no key input operation (S14: NO), a series of processings from Step S5 to Step S6 and to Step S13 is repeated. By performing the above operation, the icon is moved on the first display 11 in accordance with the dragging operation.

In the case where the dragging operation is finished within the area of the first display 11, the user does not have to press any key. When the icon is moved to an intended position, the user detaches e.g. his or her fingertip from the icon.

Then, when the position detection is no longer performed in Step S5 (S5: NO), the CPU 100 causes to display the icon at the finally detected position in a normal display manner, and the processing is ended.

On the other hand, in the case where the user intends to move the icon to the second display 21, the user presses a predetermined key.

Then, if it is determined in Step S14 that a certain input operation has been performed (S14: YES), the CPU 100 executes the reduced screen display processing (S7, S8). By performing the above operation, the first screen and the second screen each having a reduced size are displayed on the first display 11 (see FIG. 8(*b*)). The processing thereafter is the same as the processing in the embodiment.

As described above, with the arrangement of the first modification, in the case where the user performs a dragging operation within the area of one display, the user is allowed to perform the dragging operation on a screen having the original size by refraining from pressing any key. Thus, in the first modification, there is no likelihood that an image of an object to be moved such as an icon may be unnecessarily reduced in size, without obstructing the user's manipulation.

<Second Modification>

Figure 9:
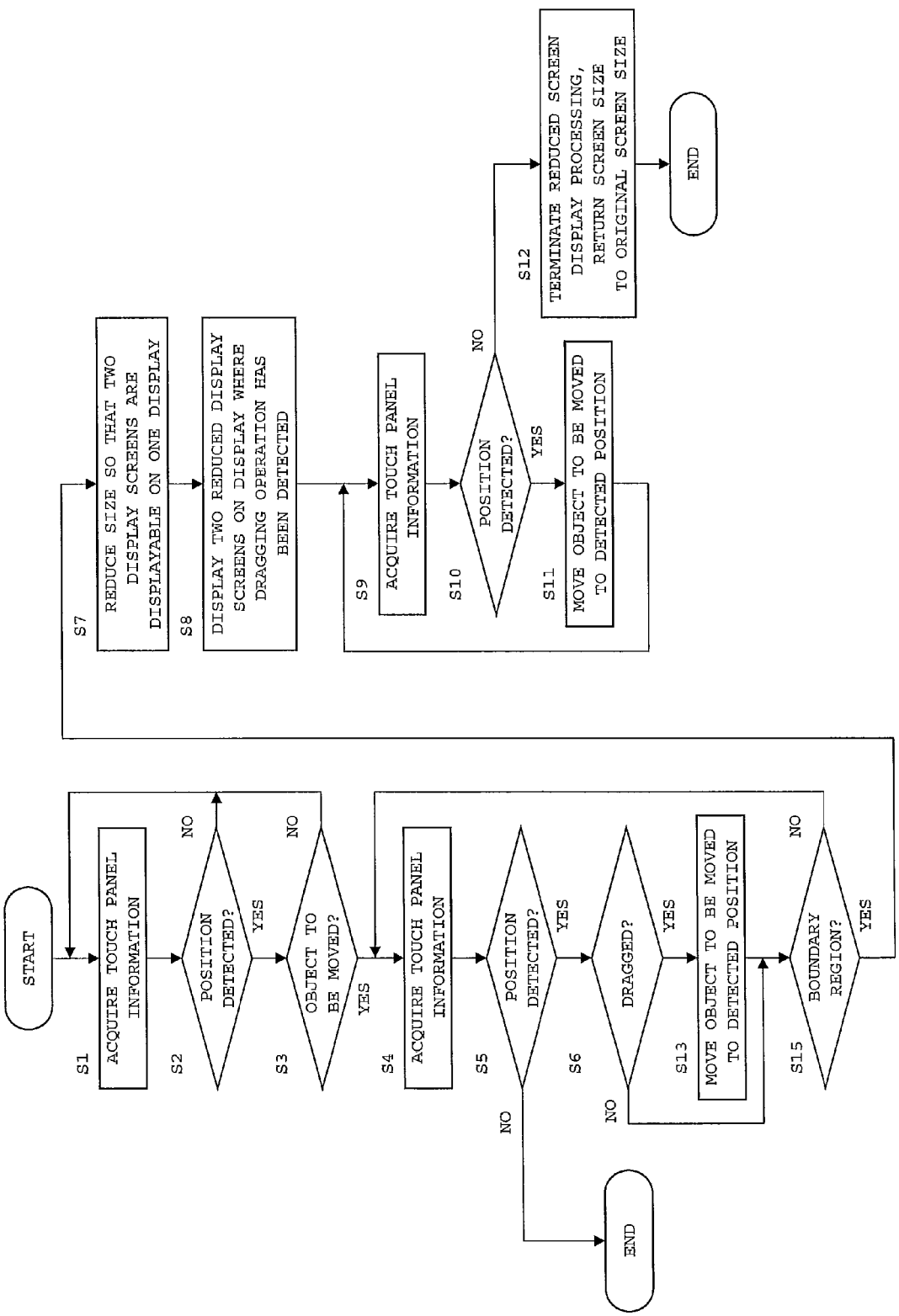
FIG. 9 is a flowchart showing a display control processing to be performed in the case where a dragging operation is performed in the second display state in a second modification.
Figure 10:
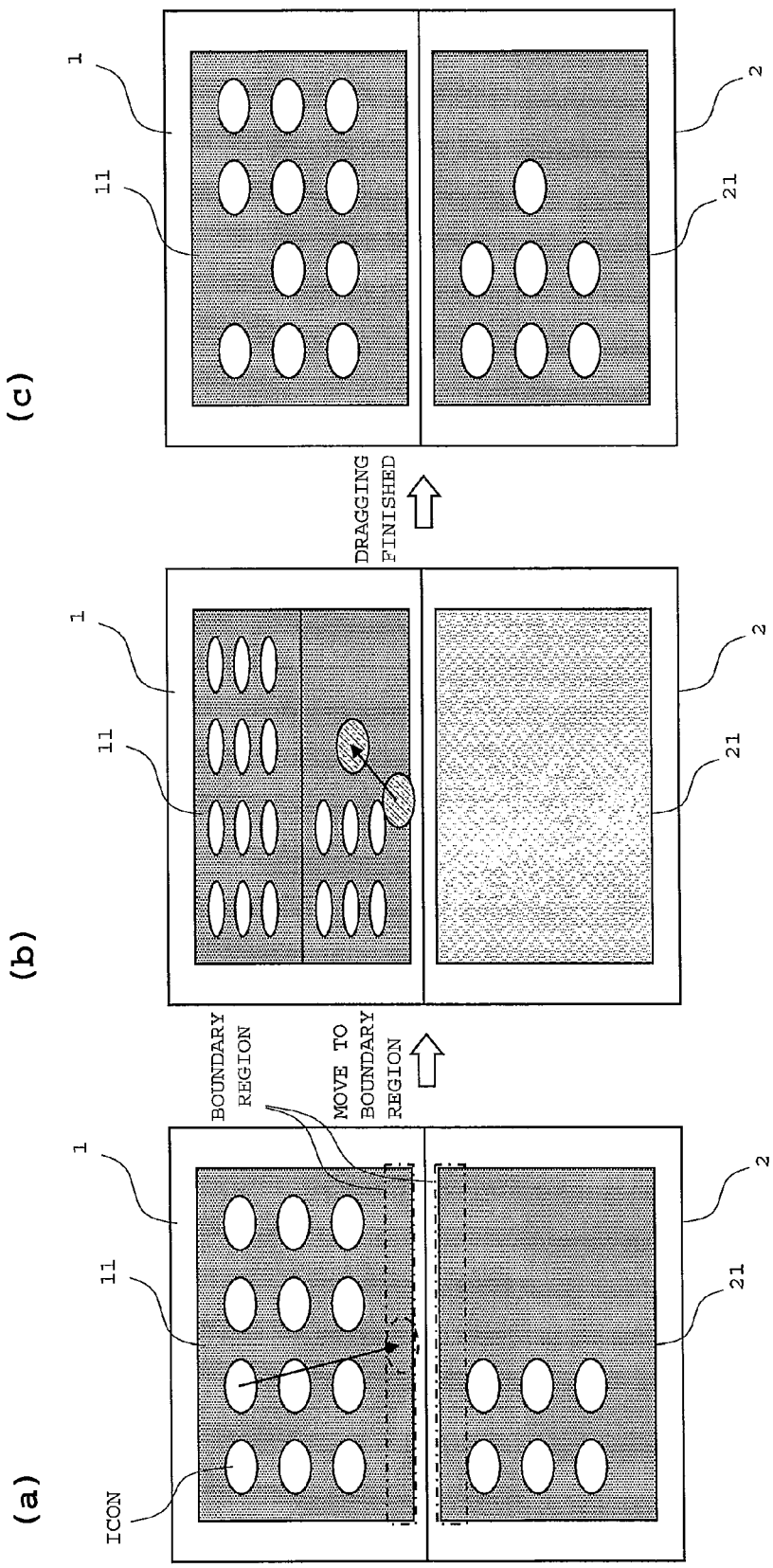
FIG. 10 is a diagram showing a screen display example in the case where a dragging operation is performed from the first display to the second display in the second modification.

FIG. 9 is a flowchart showing a display control processing to be performed in the case where a dragging operation is performed in the second display state in the second modification. Further, FIG. 10 is a diagram showing a screen display example in the second modification, in the case where a dragging operation is performed from the first display 11 to the second display 21.

In the arrangement of the first modification, the user is required to operate a key each time the user perform dragging operation between the two display sections.

In view of the above, in the arrangement of the second modification, there is automatically detected a condition that a dragging operation is highly likely to be performed between the first display 11 and the second display 12, and the reduced screen display processing (S7, S8) is executed in such a condition. In this section, only a processing that differs from the embodiment and the first modification is described.

Similarly to the first modification, after a dragged icon is moved to a detected position in Step S13 (S13), the CPU 100 determines whether the detected position coincides with a position within a predetermined boundary region (S15). The boundary region is, as shown in FIG. 10(*a*), defined on a lower end of the first display 11 and an upper end of the second display 21, which are ends of the first display 11 and the second display 21 corresponding to a boundary between the first display 11 and the second display 21.

In the case where the user drags an icon toward the side of the second display 21, the user moves the icon to the lower end of the first display 11 (see FIG. 10(*a*)).

If it is determined that the detected position is a position within the boundary region in response to moving of the icon to the boundary region (S15: YES), the CPU 100 executes the reduced screen display processing (S7, S8). By performing the above operation, the first screen and the second screen each having a reduced size are displayed on the first display 11 (see FIG. 10(*b*)). The processing thereafter is the same as the processing in the embodiment.

As described above, with the arrangement of the second modification, similarly to the first modification, in the case where the user performs a dragging operation within the area of one display, the user is allowed to perform the dragging operation on a screen having the original size. Thus, in the second modification, there is no likelihood that an image of an object to be moved such as an icon may be unnecessarily reduced in size, without obstructing the user's manipulation. Furthermore, the user does not have to operate a key each time the user performs a dragging operation between the two display sections.

<Third Modification>

Figure 11:
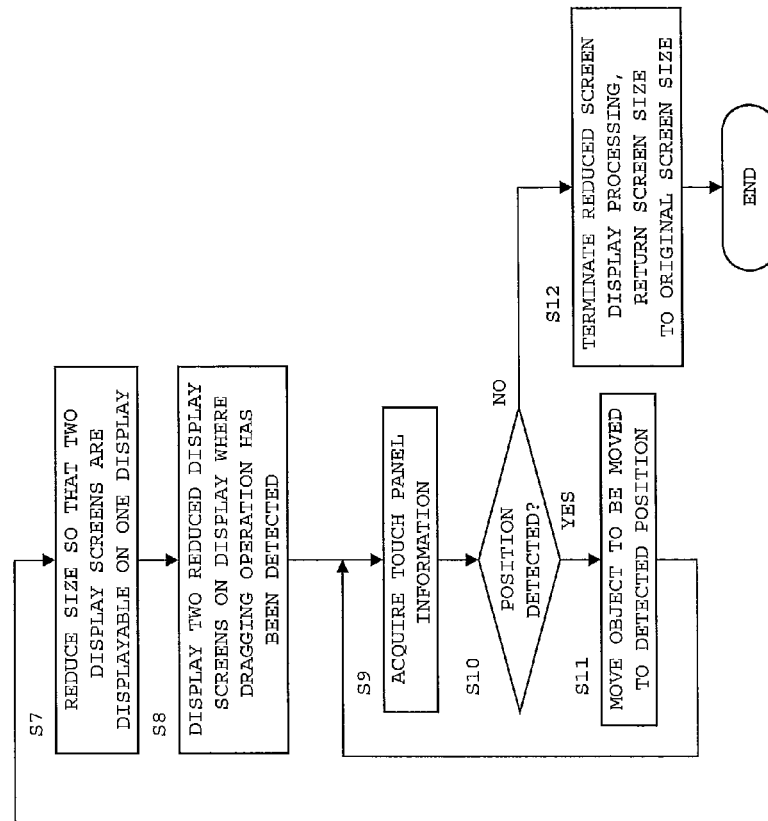
FIG. 11 is a flowchart showing a display control processing to be performed in the case where a dragging operation is performed in the second display state in a third modification.
Figure 11:
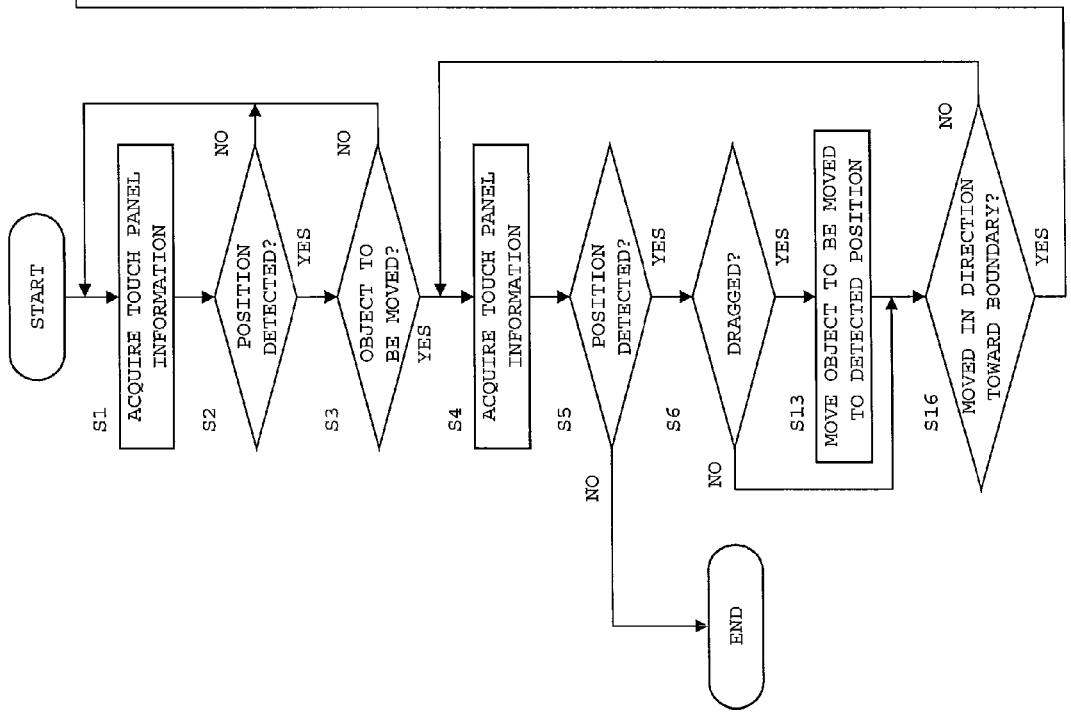

FIG. 11 is a flowchart showing a display control processing to be performed in the case where a dragging operation is performed in the second display state in the third modification.

In the arrangement of the second modification, as shown in FIG. 10(*b*), when the reduced screen display processing has been executed, the dragged icon is located at the lower end of the first display 11. Therefore, in the case where the icon is moved to an intended position on the second screen, the user is required to move the icon to an upper position on the second screen. This may involve unnecessary movement of the icon.

In view of the above, in the arrangement of the third modification, the processing of Step S16 shown in FIG. 11 is executed, in place of the processing of Step S15 in FIG. 9 of the second modification. Specifically, the CPU 100 determines whether the icon has been moved in the direction toward the boundary region, in other words, in the direction toward the second display 21 (S16). In this example, the CPU 100 compares between a previously detected position and a currently detected position, and determines that the icon has been moved in the direction toward the boundary region, if the currently detected position is closer to the second display 21. Then, if it is determined that the icon has been moved in the direction toward the boundary region (S16: YES), the CPU 100 executes the reduced screen display processing (Steps S7, S8).

As described above, with the arrangement of the third modification, the reduced screen display processing is executed, without the need of moving an icon to the end of a display. This eliminates or avoids a condition that the user is required to return the icon to an inner position in the display after the reduced screen display processing has been executed. Thus, the above arrangement eliminates or avoids unnecessary movement of an icon.

<Fourth Modification>

In the embodiment, there has been described a display control processing by way of a concrete example, in which an icon displayed in a menu screen is dragged. Alternatively, the display control processing shown in FIG. 5 may be applied to a case where another object to be moved, for instance, a thumbnail of a photograph or a highlighted character string for e.g. copying is dragged, which will be described in the following.

Figure 12:
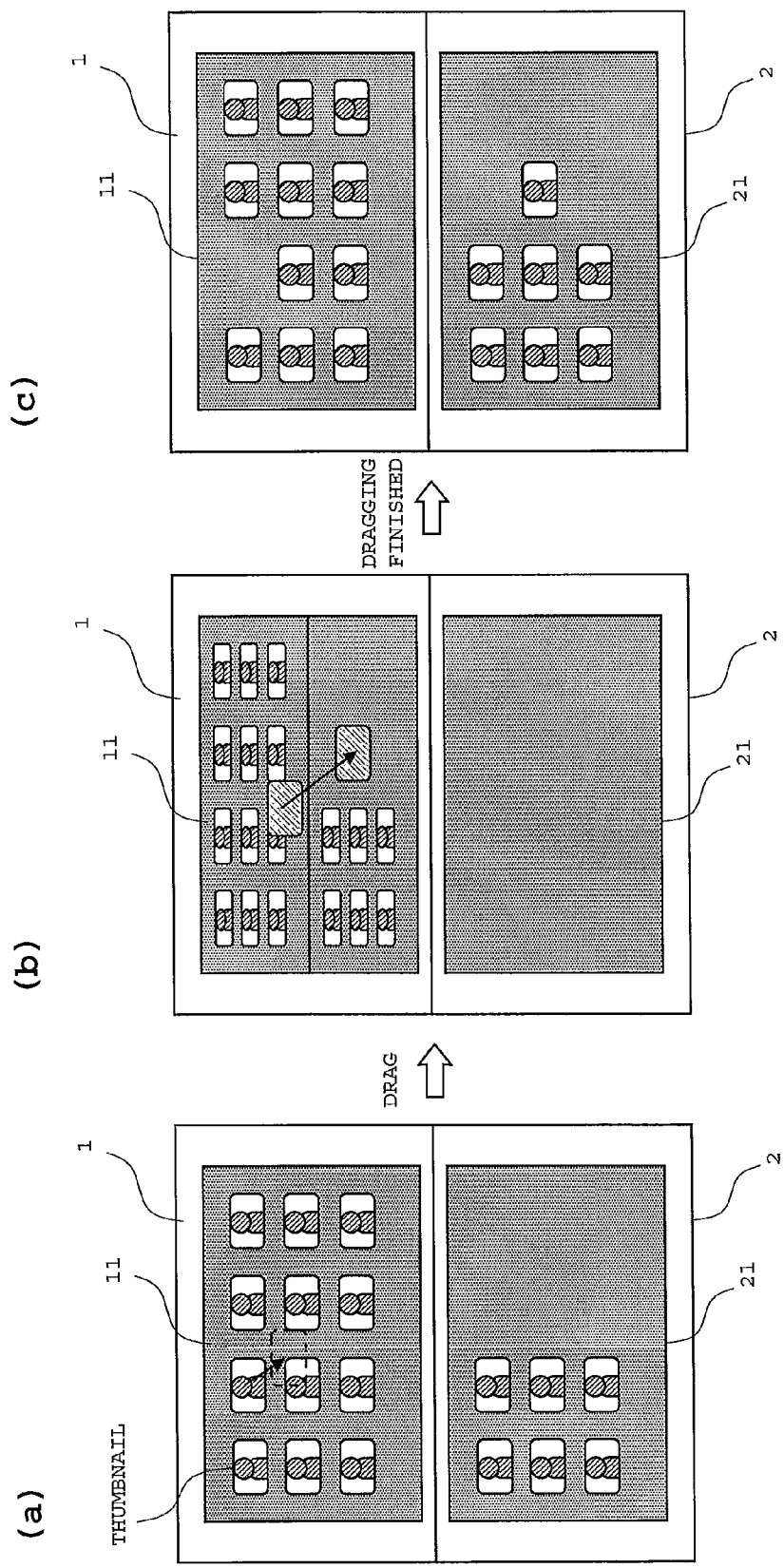
FIG. 12 is a diagram showing a screen display example in the case where a thumbnail displayed on a thumbnail screen of the first display is moved to a thumbnail screen of the second display by a dragging operation in a fourth modification.

FIG. 12 is a diagram showing a screen display example, in the case where a thumbnail displayed on a thumbnail screen of the first display 11 is dragged to a thumbnail screen of the second display 21. Thumbnail screens in which multitudes of thumbnails of photographs are disposed are displayed on the first display 11 and the second display 21, respectively.

When one of the thumbnails is dragged on the first display 11 (see FIG. 12(*a*)), the two thumbnail screens are reduced in size, and the reduced thumbnail screens are displayed on the first display 11 (see FIG. 12(*b*)). Thereafter, the dragged thumbnail is moved to an intended position on the lower thumbnail screen in the first display 11, and when the dragging operation has finished, the two thumbnail screens having the reduced size are returned to the thumbnail screens having the original size, and each of the thumbnail screens having the original size is displayed on the first or second displays 11, 21 on which the thumbnail screen is originally displayed. The dragged thumbnail is erased from the first display 11, and is displayed on the second display 21 (see FIG. 12(c)).

Figure 13:
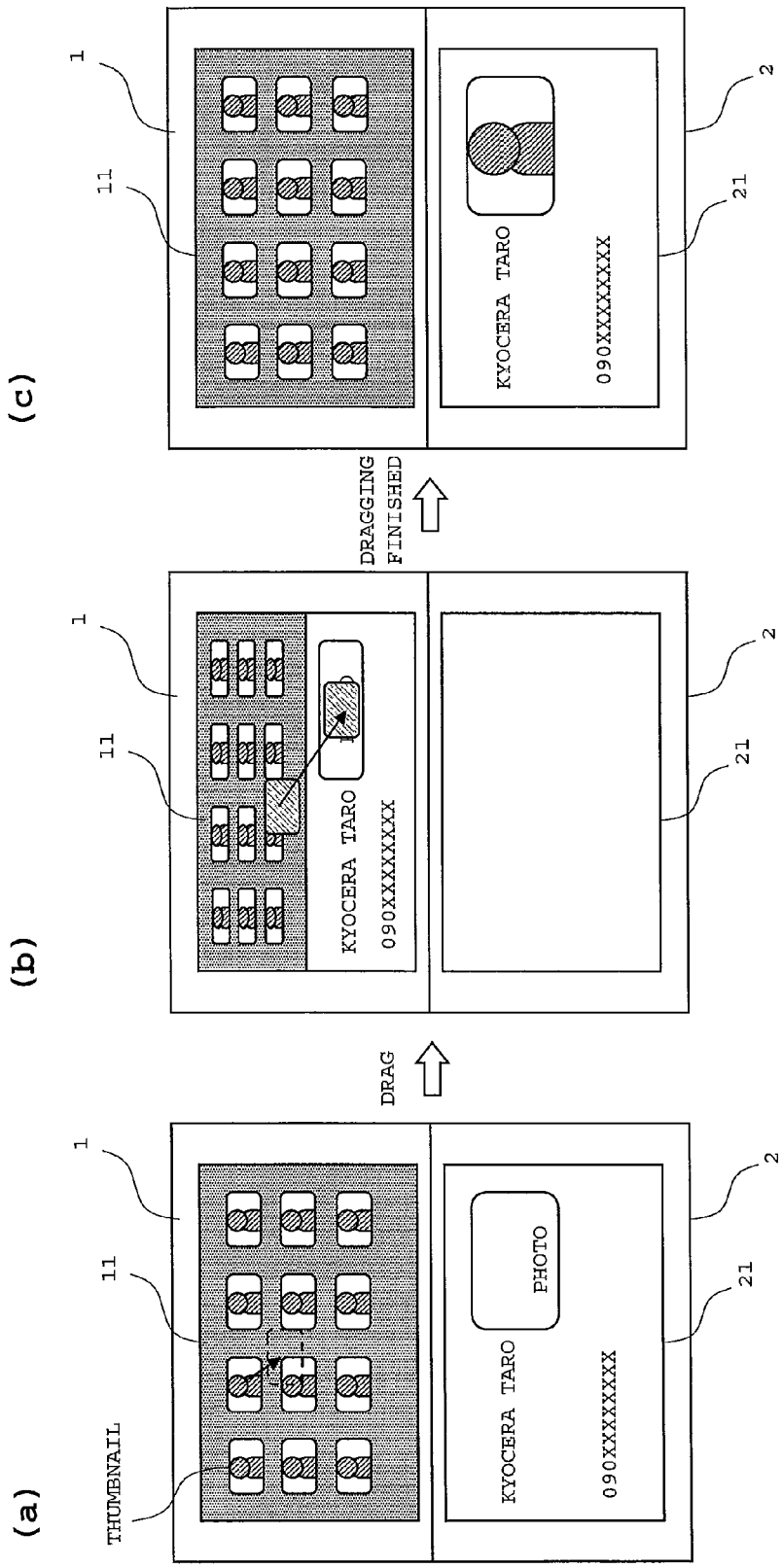
FIG. 13 is a diagram showing a screen display example in the case where a thumbnail displayed on a thumbnail screen of the first display is moved to a photo area displayed on a phonebook screen of the second display by a dragging operation in the fourth modification.

FIG. 13 is a diagram showing a screen display example, in the case where a thumbnail displayed on a thumbnail screen of the first display 11 is dragged to a photo area displayed on a phonebook screen of the second display 21. A thumbnail screen is displayed on the first display 11, and a phonebook screen indicating the name and the phone number of the person represented by the thumbnail to be dragged is displayed on the second display 21.

When one of the thumbnails is dragged on the first display 11 (see FIG. 13(a)), the thumbnail screen and the phonebook screen are reduced in size, and the thumbnail screen and the phonebook screen having the reduced size are displayed on the first display 11 (see FIG. 13(b)). Thereafter, the dragged thumbnail is moved to the photo area on the phonebook screen in the first display 11, and when the dragging operation has finished, the size of the thumbnail screen and the phonebook screen is returned to the original size, and the thumbnail screen and the phonebook screen having the original size are respectively displayed on the first and second displays 11, 21 on which the thumbnail screen and the phonebook screen are originally displayed. The dragged thumbnail is kept on being displayed at the original position in the first display 11, and a photograph corresponding to the dragged thumbnail is disposed in the photo area of the phonebook screen displayed on the second display 21 (see FIG. 13(c)).

Figure 14:
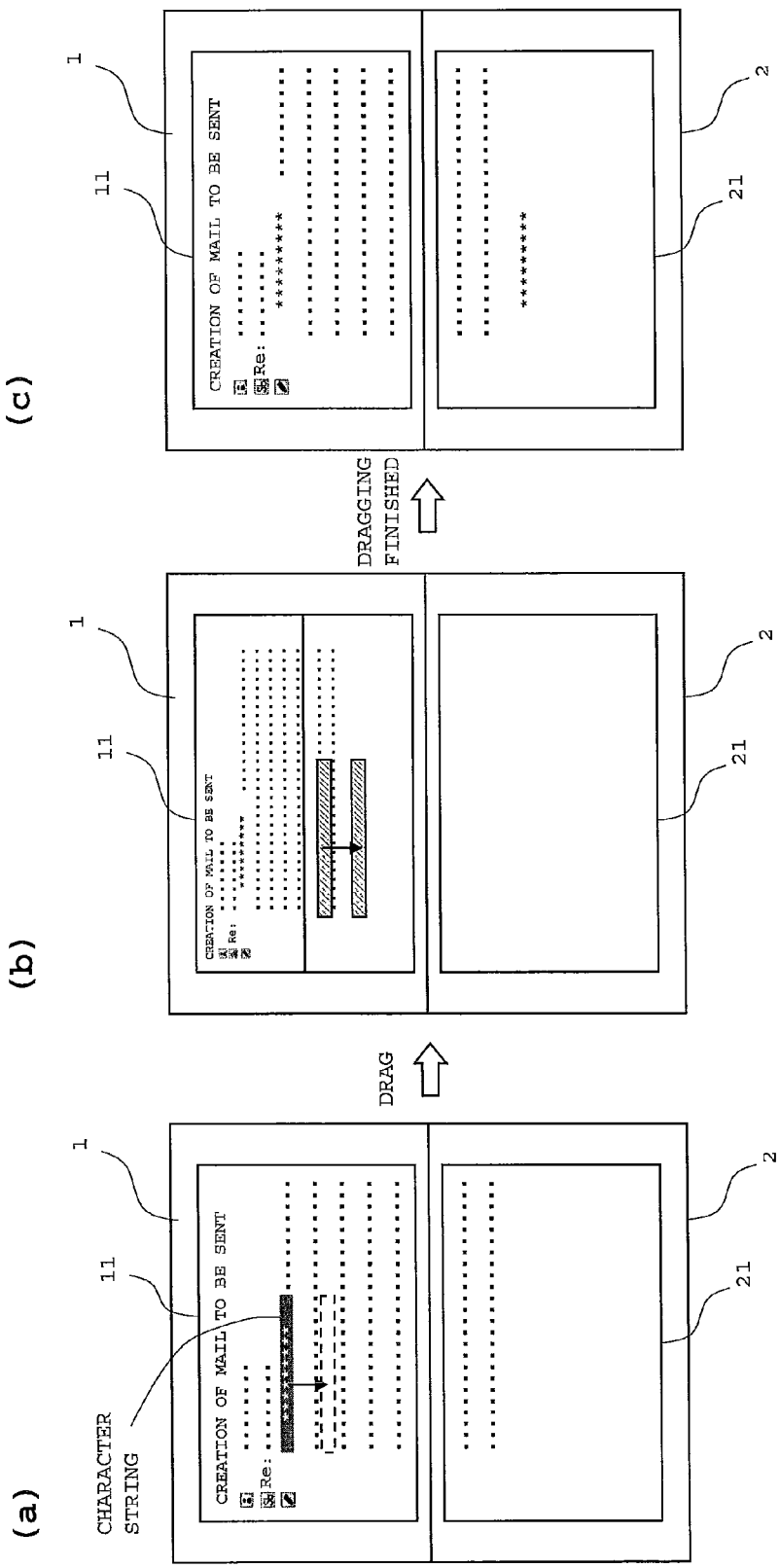
FIG. 14 is a diagram showing a screen display example in the case where a character string indicated on a document creation screen of the first display is moved to a document creation screen of the second display by a dragging operation in the fourth modification.

FIG. 14 is a diagram showing a screen display example, in the case where a character string indicated on a document creation screen of the first display 11 is dragged to a document creation screen of the second display 21. Document creation screens on which the user is allowed to create a mail document to be sent are displayed on the first display 11 and the second display 21. The document creation screen on the first display 11 and the document creation screen on the second display 21 are configured into consecutive screens, and the message on the upper document creation screen is followed by the message on the lower document creation screen.

In response to user's dragging a highlighted character string for copying on the first display 11 (see FIG. 14(a)), the two document creation screens are reduced in size, and the two document creation screens having the reduced size are displayed on the first display 11 (see FIG. 14(b)). Thereafter, the dragged character string is moved to an intended position on the lower document creation screen in the first display 11, and when the dragging operation has finished, the size of the two document creation screens is returned to the original size, and each of the two document creation screens having the original size is displayed on the first or second displays 11, 21 on which the document creation screen is originally displayed. The dragged character string is kept on being displayed at the original position in the first display 11, and a copy of the character string is displayed on the second display 21 (see FIG. 14(c)).

Figure 15:
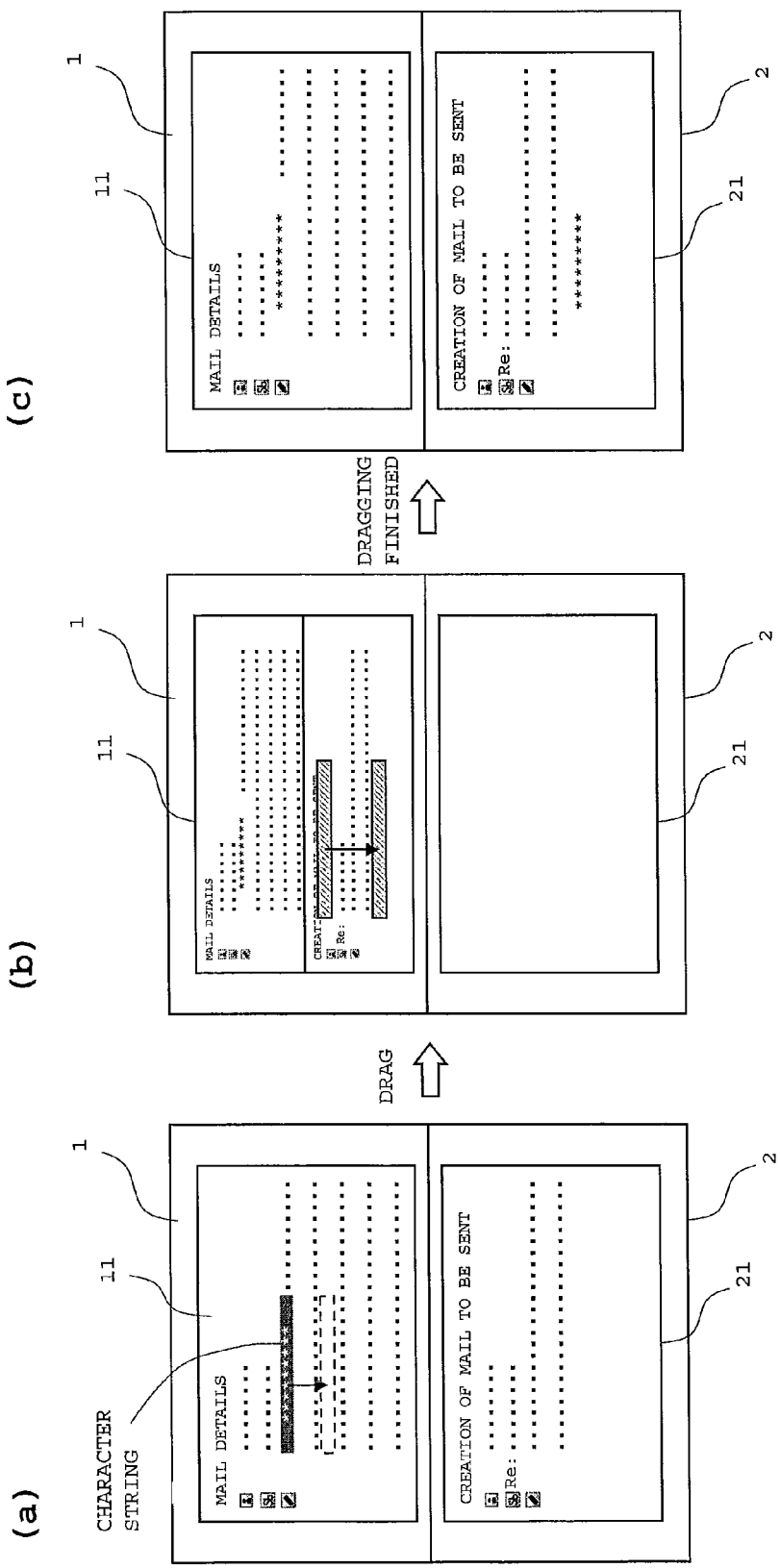
FIG. 15 is a diagram showing a screen display example in the case where a character string indicated on a detail display screen of the first display is moved to a document creation screen of the second display by a dragging operation in the fourth modification.

FIG. 15 is a diagram showing a screen display example, in the case where a character string indicated on a detail display screen of the first display 11 is dragged to a document creation screen on the second display 21. A detail display screen indicating a message of a received mail is displayed on the first display 11, and a document creation screen on which the user is allowed to create a mail document to be sent is displayed on the second display 21.

In response to user's dragging a highlighted character string for copying on the first display 11 (see FIG. 15(a)), the detail display screen and the document creation screen are reduced in size, and the detail display screen and the document creation screen having the reduced size are displayed on the first display 11 (see FIG. 15(b)). Thereafter, the dragged character string is moved to an intended position on the document creation screen in the first display 11, and when the dragging operation has finished, the size of the detail display screen and the document creation screen is returned to the original size, and the detail display screen and the document creation screen having the original size are respectively displayed on the first and second display 11, 21 on which the detail display screen and the document creation screen are originally displayed. The dragged character is kept on being displayed at the original position on the first display 11, and a copy of the character string is displayed on the second display 21 (see FIG. 15(c)).

Figure 16:
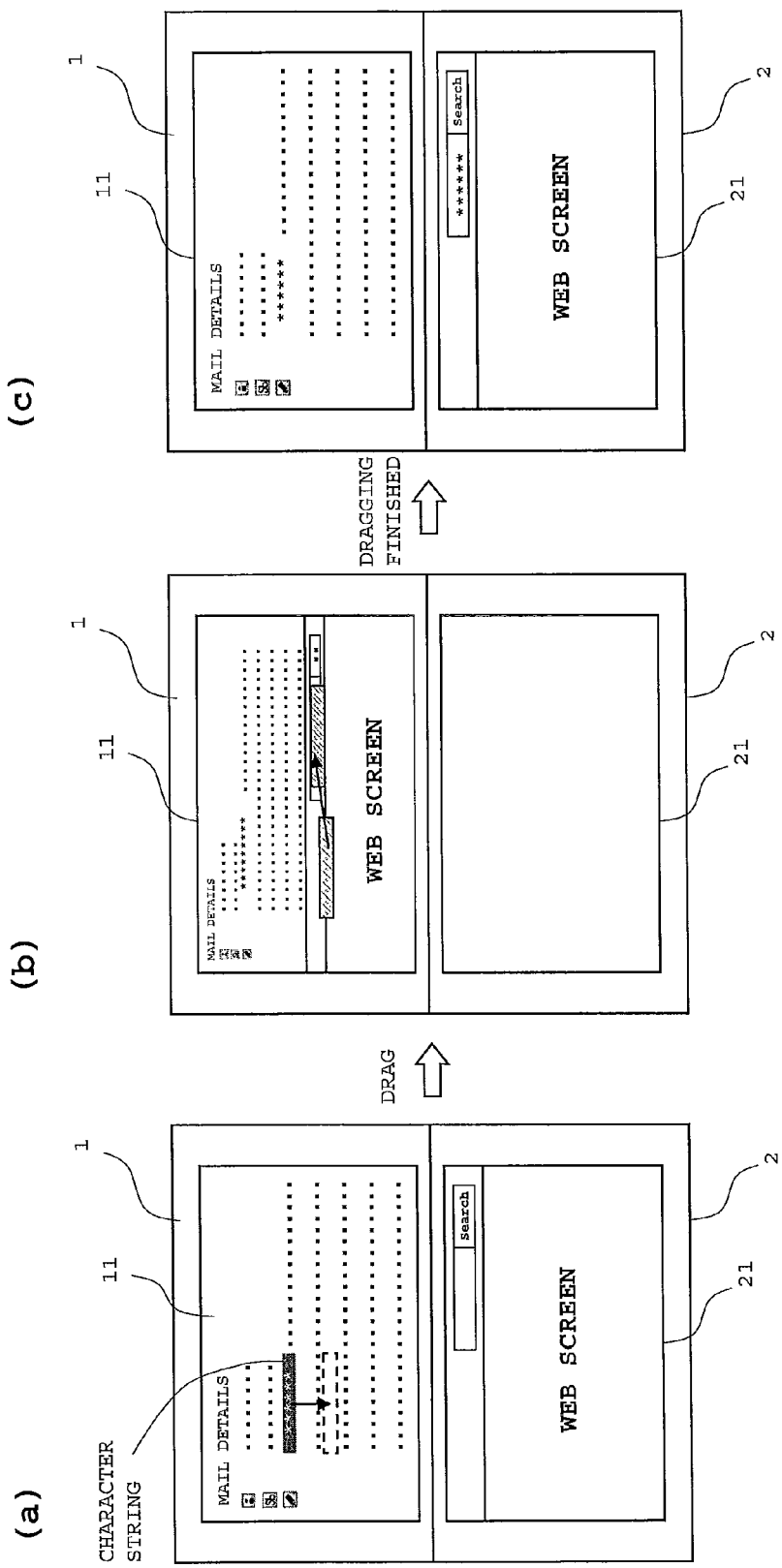
FIG. 16 is a diagram showing a screen display example in the case where a character string indicated on a detail display screen of the first display is moved to a Web screen of the second display by a dragging operation in the fourth modification.

FIG. 16 is a diagram showing a screen display example, in the case where a character string indicated on a detail display screen of the first display 11 is dragged to a Web screen of the second display 21. A detail display screen indicating a message of a received mail is displayed on the first display 11, and a Web screen of the Internet is displayed on the second display 21.

For instance, let us take an example, in which a term indicated in the detail display screen is searched on the Web screen. In response to user's dragging a highlighted character string (a term) on the first display 11 (see FIG. 16(a)), the detail display screen and the Web screen are reduced in size, and the detail display screen and the Web screen having the reduced size are displayed on the first display 11 (see FIG. 16(b)). Thereafter, the dragged character string is moved to a search textbox on the Web screen in the first display 11, and when the dragging operation has finished, the size of the detail display screen and the Web screen is returned to the original size, and the detail display screen and the Web screen having the original size are respectively displayed on the first and second displays 11, 12 on which the detail display screen and the Web screen are originally displayed. The dragged character string is kept on being displayed at the original position on the first display 11, and a copy of the character string is disposed in the search textbox on the Web screen displayed on the second display 21 (see FIG. 16(c)).

The display control processings shown in FIG. 7, FIG. 9 and FIG. 11 may be applied to the examples shown in FIGS. 12 through 16.

<Fifth Modification>

Figure 17:
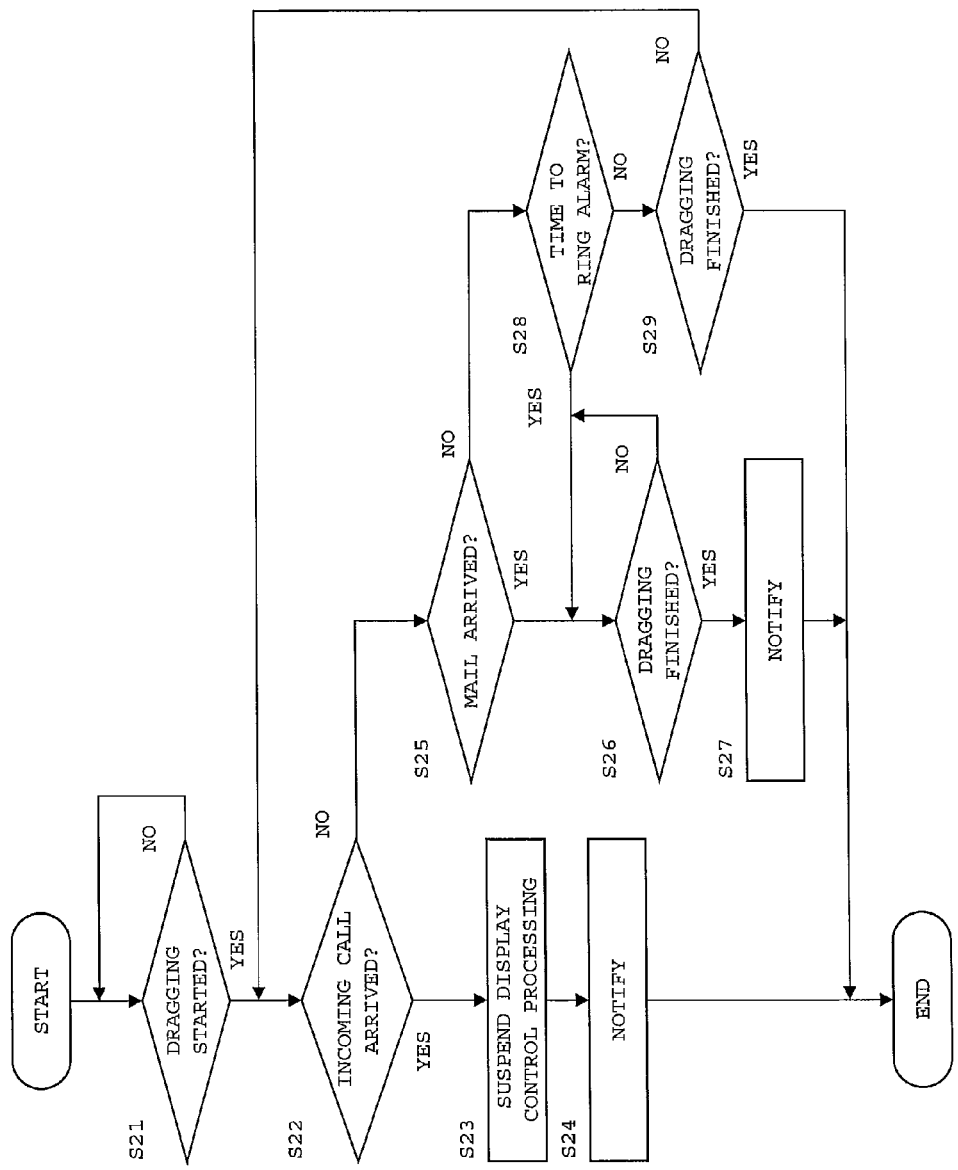
FIG. 17 is a flowchart showing a control processing to be performed in the case where an interruption such as a phone call is made during a dragging operation in a fifth modification.

FIG. 17 is a flowchart showing a control processing to be performed, in the case where an interruption such as an arrival of an incoming call is performed during a dragging operation in the fifth modification.

The control processing is executed in parallel with the display control processings shown in FIG. 5, FIG. 7, FIG. 9, and FIG. 11 by the CPU 100.

Upon start of a dragging operation (S21: YES), the CPU 100 monitors whether an incoming call has arrived, whether an electronic mail has arrived, or whether the time has come to ring an alarm until the dragging operation is finished (Step S22 to Step S25, to Step S28, and to Step S29).

If it is determined that an incoming call has arrived during a dragging operation (S22: YES), the CPU 100 suspends the display control processing in execution (S23). Then, the CPU 100 notifies arrival of the incoming call (S24). Specifically, the CPU 100 causes to display an incoming call screen composed of e.g. the name and the phone number of the caller on the first display 11 or the second display 21, and causes to output a ringtone from the external speaker 308.

By performing the above operation, the user is allowed to quickly answer the phone.

On the other hand, if it is determined that an incoming call has arrived (S25: YES) or if it is determined that the time to ring an alarm has come (S28: YES), the CPU 100 determines whether the dragging operation has finished (S26). If it is determined that the dragging operation has not finished (S26: NO), the CPU 100 waits. Then, when the dragging operation has finished (S26: YES), in the case where an electronic mail has arrived, the CPU 100 notifies arrival of the electronic mail (S27). Specifically, a ring tone is output from the external speaker 308, and at the same time, an icon representing arrival of an electronic mail is displayed on the first display 11 or the second display 21.

By performing the above operation, the user is allowed to perform a dragging operation without being interrupted by a ring alert notifying arrival of an electronic mail or an alarm sound. Further, after the dragging operation has finished, the user is allowed to be notified that an electronic mail has arrived or the time to ring an alarm has come.

The icon representing arrival of an electronic mail may be displayed in a corner on the first display 11 or the second display 21 during a dragging operation.

<Other Modifications>

The following various modifications may be applied, other than the foregoing embodiment and the modifications.

Figure 18:
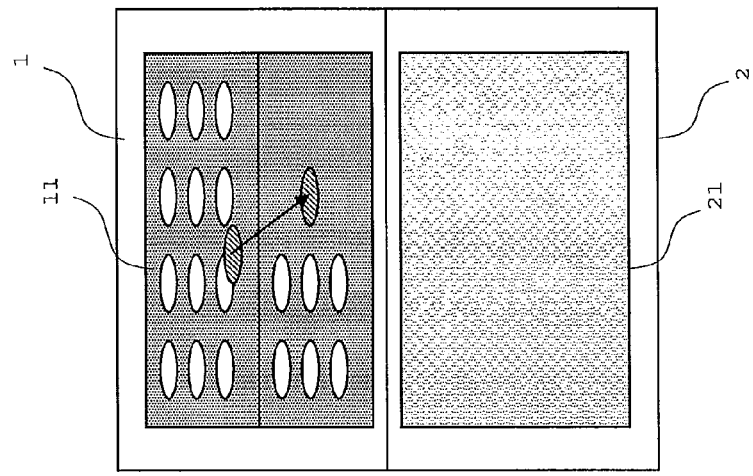
FIG. 18 is a diagram showing a modification example of display screens of the first display and the second display which are reduced in size by a reduced screen display processing.
Figure 18:
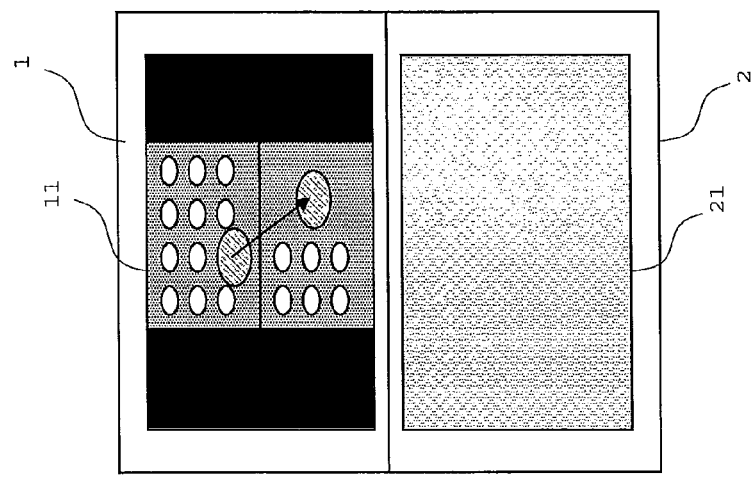

For instance, in the embodiment and the modifications, in the reduced screen display processing, the display screens of the first display 11 and the second display 21 are reduced in size in up and down directions. Alternatively, as shown in FIG. 18(*a*), the display screens of the first display 11 and the second display 21 may be reduced in size in up and down and left and right directions.

Further, in the embodiment and the modifications, in the reduced screen display processing, the size of an icon being dragged is returned to the original size. Alternatively, as shown in FIG. 18(*b*), an icon being dragged may be reduced in size for displaying, as well as the display screens surrounding the icon.

Furthermore, in the embodiment, the invention is applied to a so-called slidable mobile phone. The invention is not limited to the foregoing arrangement, but may be applied to a so-called foldable mobile phone.

In addition, the inventive mobile phone is not limited to a mobile phone, but the invention may include e.g. a PDA (Personal Digital Assistant).

The embodiment of the invention may be changed or modified in various ways as necessary, as far as such changes and modifications do not depart from the scope of the claims of the invention.

REFERENCE SIGNS LIST

11 First display
21 Second display
12 First touch panel
22 Second touch panel
100 CPU

The invention claimed is:

1. A mobile terminal device, comprising:
a display;
a touch panel configured to detect a start of a dragging operation on an object displayed on a first display screen, displayed on the display, and an end of the dragging operation; and
at least one central processing unit (CPU) that
generates a reduced-size image of a second display screen, which is different from the first display screen, wherein the reduced-size image visually represents the second display screen but at a smaller size than the second display screen,
displays the reduced-size image of the second display screen on the display in response to the detection of the start of the dragging operation, and
moves the object from the first display screen to the second display screen in response to the detection of the end of the dragging operation, wherein the location of the object at the end of the dragging operation is on the reduced-size image.

2. The mobile terminal device according to claim 1, wherein the object to be moved is an icon.

3. The mobile terminal device according to claim 1, wherein the reduced image is a vertically and horizontally reduced-size image of the second display screen.

4. The mobile terminal device according to claim 1, wherein the at least one CPU reduces in size the object in response to the detection of the start of the dragging operation.

5. The mobile terminal device according to claim 4, wherein the at least one CPU reduces in size the object in vertical and horizontal directions.

6. A display control method comprising:
displaying a first display screen on a display;
detecting a start of a dragging operation on an object displayed on the first display screen;
generating a reduced-size image of a second display screen, which is different from the first display screen, wherein the reduced-size image visually represents the second display screen but at a smaller size than the second display screen;
displaying the reduced-size image of the second display screen on the display in response to detecting the start of the dragging operation;
detecting an end of the dragging operation on the object, wherein the location of the object at the end of the dragging operation is on the reduced-size image; and
moving the object from the first display screen to the second display screen in response to detecting the end of the dragging operation.

* * * * *